(12) United States Patent
Imamura

(10) Patent No.: US 6,291,545 B2
(45) Date of Patent: *Sep. 18, 2001

(54) FLUORINE-CONTAINING EPOXY RESIN COMPOSITION READILY SOLUBLE IN SOLVENT

(75) Inventor: Isao Imamura, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/776,747

(22) PCT Filed: Jun. 13, 1996

(86) PCT No.: PCT/JP96/01606

§ 371 Date: Apr. 4, 1997

§ 102(e) Date: Apr. 4, 1997

(87) PCT Pub. No.: WO96/41835

PCT Pub. Date: Dec. 27, 1996

(30) Foreign Application Priority Data

Jun. 13, 1995 (JP) .................................................. 7-146269
Jun. 3, 1996 (JP) .................................................. 8-140192

(51) Int. Cl.$^7$ ........................................................ C08F 2/46
(52) U.S. Cl. .............................. 522/181; 347/64; 522/31; 522/65; 522/66; 522/67; 528/103
(58) Field of Search ................................ 528/103; 347/64; 522/181, 31, 65, 66, 67

(56) References Cited

U.S. PATENT DOCUMENTS

| | | | |
|---|---|---|---|
| 4,267,302 | * | 5/1981 | Ohmori ................. 528/103 |
| 4,284,746 | * | 8/1981 | Ohmori ................... 528/27 |
| 5,365,255 | * | 11/1994 | Inoue ..................... 347/45 |
| 5,663,752 | * | 9/1997 | Imamura et al. ............. 347/65 |

FOREIGN PATENT DOCUMENTS

| | | |
|---|---|---|
| 0631869 A1 | 1/1995 | (EP) . |
| 55-45774 | 3/1980 | (JP) . |
| 55-54324 | 4/1980 | (JP) . |
| 63-199724 | 8/1988 | (JP) . |
| 63-317518 | 12/1988 | (JP) . |
| 4-211959 | 8/1992 | (JP) . |
| 5-124199 | 5/1993 | (JP) . |

OTHER PUBLICATIONS

Encyclop. of Polymer Science and Eng., vol. 6, pp. 340–343, 1967.*

* cited by examiner

Primary Examiner—Robert Dawson
Assistant Examiner—D. Aylward
(74) Attorney, Agent, or Firm—Fitzpatrick, Cella, Harper & Scinto

(57) ABSTRACT

A fluorine-containing epoxy resin composition at least contains: a fluorine-containing epoxy resin composition at least containing: a component (a) in an amount of from 5 to 80 parts by weight; a component (b) in an amount of from 5 to 40 parts by weight; and a component (c) in an amount of from 5 to 80 parts by weight, wherein the component (a) comprises a polyfunctional epoxy resin having two or more epoxy groups in one molecule and not containing F and Si; the component (b) comprises an epoxy compound having a perfluoro group at a terminal; and the component (c) comprises a compound containing in one molecule two or more of one kind or two or more kinds selected from an epoxy group, an alcohol group, a carboxylic acid group, and an amine group. The fluorine-containing epoxy resin composition is suitably usable for treating a specified surface of a member or device so as to impart a liquid repellent property thereto. The resin composition is also usable as an adhesive for bonding members to each other, and as a paint when added with a coloring material diffused therein.

24 Claims, 8 Drawing Sheets

FLUORINE-CONTAINING EPOXY RESIN COMPOSITION READILY SOLUBLE IN SOLVENT

BACKGROUND OF THE INVENTION

1. Field of the Invention

The present invention relates to a fluorine-containing epoxy resin composition which is readily soluble in commonly used organic solvents and enables formation of a high quality coating film excellent in surface properties (hardness and smoothness), liquid repellent property, and adhesion property. The present invention also relates to a process of treating a surface of an object using said resin composition so as to form a surface excellent in surface properties (hardness and smoothness), adhesion property, and liquid repellent property on the object.

2. Related Background Art

It has been known that liquid repellent agents commonly used are stable thermally and chemically and are excellent in weatherability, water tightness, chemical resistance, solvent resistance, mold releasability, and liquid repellent property; however, they are not necessarily satisfactory in terms of hardness and adhesion to a member.

Such a liquid repellent agent has been used in a variety of industrial fields. For example, in the ink jet field, there has arisen an inconvenience that ink is accumulated on neighborhoods of discharging outlets provided in an ink jet head for discharging ink and the ink thus accumulated possibly causes deviation of the discharging direction of the ink and blocks the discharging outlets, and to cope with such an inconvenience, a liquid repellent agent has been applied on a surface provided with the discharging ports (the surface will be hereinafter occasionally be called a discharging outlet surface).

FIG. 14 is a schematic view showing one example of an ink jet head in which a discharging outlet surface is subjected to a liquid repellent finish using a liquid repellent agent. In FIG. 14, reference numeral 101 indicates a substrate for an ink jet head, which is formed of a material such as glass, aluminum or silicon. The substrate 101 is joined with a top plate 102 provided with grooves for forming liquid pathways 104. The liquid pathways 104 are formed of the grooves of the top plate 102 and the base plate 101. An energy generating element 103 for discharging ink is provided in each of the liquid pathways 104. A discharging outlet plate 107, which is provided with discharging outlets 108 each communicating with the liquid pathways 104 for discharging ink, is joined with a joined body of the substrate 101 and the top plate 102, to form an ink jet head. A liquid repellent layer 107*a* formed of a fluorine-based resin is provided on a surface having the discharging outlets 108 (hereinafter, referred to as a discharging outlet surface) of the discharging outlet plate 107. The liquid repellent layer 107*a* has a pattern as shown in FIG. 4 in which neighborhoods of the discharging ports have different liquid repellent properties than the remaining portion. As is well known, the configuration in which a liquid repellent area extends locally on neighborhoods of discharging outlets and a hydrophilic area 107' is formed around the liquid repellent area is effective in removal of ink adhering on the discharging outlet surface, as compared with a configuration in which the liquid repellent area extends over the entire discharging outlet surface.

That is, even in the case where a liquid repellent layer is provided on a discharging outlet surface of an ink jet head, if ink in mist adheres on the discharging outlet surface, it possibly remains thereon. In general, the ink remaining on the discharging outlet surface is removed by a wiping operation using a cleaning blade; however, if the ink remaining on the discharging outlet surface is thickened in viscosity, the removal of the ink using the cleaning blade becomes difficult. When the ink thickened in viscosity is located on neighborhoods of the discharging outlets, the ink accumulated thereon is liable to cause deviation of the discharging direction of ink and to block the discharging outlets. For this reason, the discharging outlet surface is so configured that it has a liquid repellent area around the discharging outlets and a hydrophilic area around the liquid repellent area for moving the ink remaining on the discharging outlet surface to the hydrophilic area. This makes it possible to at least reduce the possibility that the ink remains around the discharging outlets and to easily collect the ink in small droplets to the hydrophilic area, and hence to facilitate the removal of the ink using the cleaning blade.

In this way, the liquid repellent agent applied on a discharging outlet surface of an ink jet head needs to have a desired adhesion property, a desired rigidity (that is, hardness), and a desired wear resistance. From this viewpoint, a fluorine based resin used as the abovementioned liquid repellent agent does not adequately satisfy the needs regarding hardness and adhesion to a member. On the other hand, Japanese Patent Laid-open No. Hei 4-211959 discloses an ink jet head having a discharging outlet surface subjected to a liquid repellent finish using a liquid repellent agent composed of a polymer having a fluorine-containing heterocyclic structure at a main chain. The discharging outlet surface subjected to a liquid repellent finish using the above polymer is excellent in liquid repellent property and also relatively excellent in wear resistance. It is to be noted that the polymer having a fluorine-containing heterocyclic structure at a main chain is being practically used at present as a liquid repellent agent for a discharging outlet surface of an ink jet head.

It is understood from the above description that the polymer having a fluorine-containing heterocyclic structure at a main chain is effective as a liquid repellent agent used for subjecting a discharging outlet surface of an ink jet head to a liquid repellent finish.

The polymer, however, does not adequately satisfy the needs in all cases as will be described below.

That is, in recent years, a variety of cartridge type ink jet heads have been commercially available for eliminating the necessity of maintenance for the ink jet head. Such a cartridge type ink jet head (hereinafter, referred to as an ink jet head cartridge) adopts a configuration that the discharging outlet surface is protected with a discharging outlet surface protecting member such as a sealing tape or a cap. The discharging outlet protecting member is removed when the ink jet head cartridge is mounted on the ink jet system. Accordingly, for an ink jet head cartridge of a type being exchanged in accordance with the color and physical property of printing ink used, the exchanging operation of the ink jet head cartridge is conducted with the discharging outlet surface exposed. Upon this exchanging operation, the discharging outlet surface of the ink jet head cartridge is often brought in contact with the user's finger, the ink jet system and/or a head cartridge storage vessel. In the case where the discharging outlet surface of such an ink jet head cartridge is provided with a liquid repellent layer formed of a liquid repellent agent composed of the polymer having a fluorine-containing heterocyclic structure at a main chain, the liquid repellent layer is relatively excellent in wear resistance in the conventional service; however, since liquid repellent layer is formed of the polymer having a low hardness, it withstands the friction due to the wiping operation but it is possibly scratched when being brought in contact with the above-mentioned obstacles. If the liquid repellent layer is not directly scratched, there is a possibility that contaminants and the like adhere on the discharging outlet surface, and consequently the liquid repellent layer may be damaged when the contaminants adhering on the discharging outlet surface are pressed on the liquid repellent layer by the cleaning blade upon wiping operation.

On the other hand, in recent years, there has been proposed an ink jet system for conducting precise printing using ink in a relatively small droplet so as to further improve the quality of a printing image. In such an improved ink jet system using ink in a relatively small droplet, the distance between the discharging outlet surface and the recording medium such as a paper sheet is made very narrow for increasing the shooting accuracy. In the case where the distance between the discharging outlet surface and the recording medium is narrow, if there is a slight failure in carrying the recording medium, the discharging outlet surface may be rubbed with the recording medium, thereby damaging the discharging outlet surface. From this viewpoint, the discharging outlet surface of the above-mentioned ink jet system needs to be provided with a liquid repellent layer formed of a liquid repellent agent having such a high hardness that the liquid repellent layer is not damaged even if it is rubbed with a recording medium.

However, most of the fluorine based resins commonly used for the liquid repellent agent are relatively low in hardness.

Incidentally, a liquid repellent layer having a large thickness is advantageous in that when the liquid repellent layer is damaged, it has a non-damaged portion under the damaged surface portion, so that it is possible to prevent the deviation of the discharging direction of the ink. However, since the liquid repellent agent composed of a polymer having a fluorine-containing heterocyclic structure at a main chain is relatively low in adhesion property, the formation of a very thick liquid repellent layer causes a problem that the liquid repellent layer peels off. Accordingly, the liquid repellent agent used for forming a liquid repellent layer on a discharging outlet surface of an ink jet head is required to have a characteristic capable of suitably controlling the film thickness as well as an excellent film formability.

In this way, the conventional liquid repellent agent cannot make compatible the hardness with the liquid repellent property at a high level, and cannot adequately satisfy the above-mentioned requirements.

European Patent Laid-open No. 631869 discloses a process of imparting a liquid repellent function on a discharging outlet surface locally at neighborhoods of discharging outlets. This process is carried out by a manner of forming a liquid repellent film over the entire discharging outlet surface using a solvent-drying type liquid repellent agent, and partially cutting off the liquid repellent film on the discharging outlet surface by way of irradiation of an excimer laser beam, thereby forming a liquid repellent pattern in which a liquid repellent area is locally formed only on neighborhoods of the discharging outlets and a hydrophilic area is formed around the liquid repellent area. However, since a polymer used as the liquid repellent agent has a fluorine-containing heterocyclic structure at a main chain and is low in energy absorbing efficiency for excimer laser, it has a difficulty in formation of a fine patterning. On the other hand, Japanese Patent Laid-open No. Hei 5-124199 discloses a process in which a photosensitive resin having a liquid repellent property is formed as a liquid repellent agent on a discharging outlet surface, and is patterned using photolithography so that a liquid repellent function is imparted on the discharging outlet surface locally at neighborhoods of discharging outlets. This process is advantageous in that a fine local liquid repellent pattern can be formed, and that even when the discharging outlet surface is subjected to a liquid repellent finish after formation of discharging outlets, liquid repellent agent does not remain in the discharging outlets.

As for the known photosensitive resins having liquid repellent properties, including the liquid repellent agent (that is, photosensitive resin) described in Japanese Patent Laid-open Hei 5-124199, if they are excellent in their initial liquid repellent properties, they cannot sufficiently keep the liquid repellent properties for a long period of time. The reason for this may be considered to be due to low hardness of the photosensitive resins as the liquid repellent agents. That is, an area formed of the photosensitive resin having a low hardness is gradually abraded with the repeated wiping operations using a cleaning blade for cleaning discharging outlets.

As described above, the conventional liquid repellent agents are not suitable for formation of a local area excellent in liquid repellent property, hardness (that is, wear resistance), and adhesion property. In view of the foregoing, it has been required to provide a liquid repellent agent for forming a film having a local repellent function and having excellent hardness (that is, wear resistance) and adhesion property, particularly, at neighborhoods of discharging outlets on a discharging outlet surface of an ink jet head

SUMMARY OF THE INVENTION

An object of the present invention is to provide an epoxy resin based composition useful for a variety of applications, which is readily soluble in commonly used solvents, exhibits such a compatible state of components that the components cannot be distinguished at a visible light level, and is excellent in hardness, liquid repellent property, adhesion property, and film formability.

Another object of the present invention is to provide an epoxy resin based composition capable of forming a high quality liquid repellent film excellent in liquid repellent property, adhesion property, and surface properties (hardness and smoothness).

A further object of the present invention is to provide an epoxy resin based composition capable of reforming a surface of a member into a surface excellent in liquid repellent property, adhesion property, and surface properties (hardness and smoothness).

A still further object of the present invention is to provide an epoxy resin based composition capable of forming a high quality liquid repellent film excellent in liquid repellent property, adhesion property, and surface properties (hardness and smoothness) on a surface of a member in a given shape.

A specific object of the present invention is to provide an epoxy resin based composition capable of forming a liquid repellent film excellent in surface properties (hardness and smoothness), liquid repellent property, and adhesion property on a discharging outlet surface of an ink jet head.

Another specific object of the present invention is to provide an epoxy resin based composition capable of forming a liquid repellent resin excellent in surface properties (hardness and smoothness), liquid repellent property, and adhesion property on a discharging outlet surface of an ink jet head in a given shape.

To attain the above objects, the present inventors have made the following examination. That is, since any conventional single liquid repellent agent has failed to attain the above objects as described above, the present inventors have attempted to develop a new resin composition capable of attaining the above object, and as such a resin composition, the present inventors have adopted a type in which components of the resin composition are in a compatible state for making uniform the performance of the resin composition. Here, the compatible state means such a state in which components are uniformly mixed and cannot be distinguished at a visible light level. The term "compatible state" used hereinafter means such a state as described above.

The present inventors have decided to use an epoxy resin as the basic component of the resin composition in terms of reactivity and workability, and have extensively studied through experiments to obtain a resin composition capable of attaining the above objects by imparting a liquid repellent property to an epoxy resin as the basic component of the resin composition. In the experiments, the examination was made using a hardening catalyst in place of a hardening agent for making full use of the epoxy resin. First, commercially available liquid repellent agents were used for imparting a liquid repellent property to an epoxy resin; however, these agents were not hardened because they did not come to be compatible with an epoxy resin. Next, compounds containing F and Si were used for imparting a liquid repellent property to an epoxy resin; however, they failed to obtain a resin composition capable of attaining the above objects although some compounds come to be compatible with an epoxy resin. The reason for this is that a compound containing F and Si compatible with an epoxy resin has an epoxy group or a functional group reactive with an epoxy group at a terminal, and consequently, if it comes to be compatible with an epoxy resin, the Si or F group is held between functional groups such as benzene rings, epoxy groups or hydroxyl groups and thereby the liquid repellent characteristic of the Si or F group is suppressed. At all events, it has been found that a compound having a Si or F group at a terminal is required to be used as a liquid repellent imparting agent. However, since the compound having a Si or F at a terminal is not compatible with an epoxy resin as described above, and from this viewpoint, the present inventors have examined a compound containing a F or Si group at a terminal which can be compatible with a composition of an epoxy resin and a compound containing a Si or F group and compatible with an epoxy resin. As a result, it has been found that an epoxy compound having a perfluoro group at a terminal is desirable as an agent for imparting a liquid repellent property to an epoxy resin. The present inventors have experimentally examined resin compositions containing the above-mentioned components, and found that a resin composition having the following configuration can attain the above objects. That is, the epoxy resin composition capable of attaining the above objects at least contains (a) a polyfunctional epoxy resin having two or more epoxy groups in one molecule and not containing F and Si; (b) an epoxy compound having a perfluoro group at a terminal; and (c) a compound having two or more of one kind of two or more kinds selected from an epoxy group, an alcohol group, carboxylic acid group, and an amine group and containing F or Si.

Since the fluorine-containing epoxy resin composition contains an epoxy based resin as a basic component, that is, the component (a), it is excellent in adhesion to a member and can be hardened at a relatively low temperature, and therefore, it provides a hardened structure excellent in physical properties. Also since the resin composition contains an epoxy compound having a perfluoro group at a terminal as the component (b), it can exhibit an excellent liquid repellent property. Further, the resin composition contains the component (c) which makes it possible to make compatible the component (a) with the component (b) at a desirable mixing ratio. Therefore, the resin composition can provide a hardened resin structure excellent in liquid repellent property, hardness and adhesion property. More specifically, the resin composition (that is, fluorine-containing epoxy resin composition) containing the components (a), (b) and (c) exhibits a desirable compatible state which can be kept even when being added with a polymerizing agent and a hardening agent, and it enables formation of a high quality hardened resin structure excellent in liquid repellent property, hardness, and adhesion property.

DESCRIPTION OF THE INVENTION AND PREFERRED EMBODIMENTS

Figure 1:
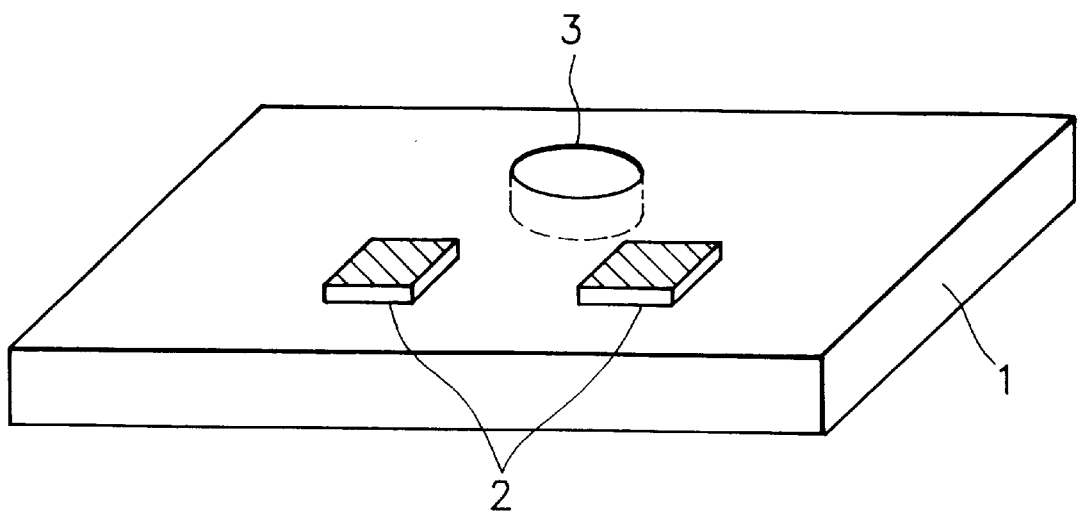
FIGS. 1 to 12 are views showing basic steps of producing an ink jet head according to an embodiment of the present invention.

A fluorine-containing epoxy resin composition as a basic feature of the present invention will be first described.

The fluorine-containing epoxy resin composition of the present invention at least contains (a) a polyfunctional epoxy resin having two or more epoxy groups in one molecule and not containing F and Si, (b) an epoxy compound having a perfluoro group at a terminal, and (c) a compound having in one molecule two or more of one kind or two or more kinds selected from an epoxy group, alcohol group, carboxylic acid group, and amine group.

The component (a) of the fluorine-containing epoxy resin composition of the present invention is composed of an epoxy resin which is a basic component for giving adhesion to a member and a mechanical strength as a structure to the resin composition. As the epoxy resin of the component (a), there is used a polyfunctional epoxy resin having two or more epoxy groups in one molecule and not containing F and Si. Specific examples of said epoxy resin may include bisphenol A type, bisphenol F type, bisphenol AD type, phenol novolac type, cresol novolac type, alicyclic type, aliphatic type, naphthalene type, and biphenyl type epoxy resins. Such an epoxy resin is commercially available, for example, under the trade name of Epikote 828 (produced by Yuka Shell Epoxy Kabushiki Kaisha), Araldite CY179 (produced by Ciba-Geigy Japan Limited), or EHPE-3158 (produced by Daicel Chemical Industries, Ltd.). The component (a) of the fluorine-containing epoxy resin composition is preferably in a range of from 10 to 80 parts by weight. When the content of the component (a) is less than 10 parts by weight, the resin composition cannot exhibit sufficient performance in terms of adhesion property to a member and mechanical strength as a structure. On the other hand, when the content of the component (a) is more than 80 parts by weight, the resin composition becomes insufficient in liquid repellent property.

The component (b) of the fluorine-containing epoxy resin composition imparts a liquid repellent property to the resin composition, and it comes to be in a compatible state with the component (a) and the component (c) which will be described later. The component (b) is, as described above, composed of an epoxy compound having a perfluoro group at a terminal. Specific examples of said epoxy compound may include 3-(2-perfluorohexyl) ethoxy-1,2-epoxypropane, and N-propyl-N-(2,3-epoxypropyl) perfluorooctanesulfonamide. Such an epoxy compound is commercially available, for example, under the trade name of MF-120, MF-130 (produced by TOHKEM PRODUCT CORPORATION). The content of the component (b) is preferably in a range of from 10 to 40 parts by weight. When the content of the component (b) is less than 10 parts by weight, the resin composition becomes insufficient in liquid repellent property; and when it is more than 40 parts by weight, the resin composition fails to obtain a sufficient hardness because of the increased monofunctional component in the resin composition.

The component (c) of the fluorine-containing resin composition functions to preferably make compatible the components (a) and (b) with each other, and it is composed of a compound having in one molecule two or more of one kind or two or more kinds selected from an epoxy group, carboxylic acid group, and an amine group. Specific examples of said compound may include 2,2-bis[p-(2,3-epoxypropoxy)phenyl]-1,1,1,3,3,3-hexafluoropropane; 1,4-bis(hexafluoro-2-hydroxy-2-propyl)benzene; 1,3-bis(glycidoxypropyl)tetramethyldisiloxane; and flourohexanediol. Such a compound is commercially available, for example, under the trade name of CHEMINOX AFEp (produced by Nippon Mektron, Ltd.), 1,4-HFAB (produced by Central Glass Co., Ltd.), or LS7970 (produced by Shin-Etsu Chemical Co., Ltd.). The content of the component (c) is preferably in a range of from 10 to 80 parts by weight. When the content of the component (c) is less than 10 parts by weight, the resin composition becomes insufficient in hardness because the component (c) does not make compatible the component (b) with the component (a); and when it is more than 80 parts by weight, the resin composition is insufficient not only in liquid repellent property but also in hardness.

In addition, in view of improving resistance to ink, it is more preferable that, of the above resins as the component (c), the compound having two or more epoxy groups in one molecule and containing F or Si is used in combination with the compound having in one molecule two or more of one kind or two or more kinds selected from alcohol group, carboxylic acid group, and an amine group and containing F or Si; and that the mixing ratio between the former compound and the latter compound is in a range of from 1:5 to 5:1 in weight %.

In the fluorine-containing epoxy resin composition containing the specified components (a), (b) and (c) in a specified composition, the three components (a), (b) and (c) are uniformly mixed with each other into a desirable compatible state. The fluorine-containing epoxy resin composition is readily soluble in commonly used solvents, and further, it can keep the above compatible state even when added with a polymerizing catalyst or a hardening agent (hereinafter, referred to as a component (d)).

The fluorine-containing epoxy resin composition of the present invention, therefore, can be applied to surface treatment for various objects, and can desirably impart a high quality liquid repellent film excellent in hardness and adhesion property onto the surfaces of the objects.

A polymerizing catalyst or hardening agent as the component (d) added to the resin composition composed of the components (a), (b) and (c) can be suitably selected in accordance with the kind of the object to be treated or the application of the object. In any case, however, the component (d), that is, a polymerizing catalyst or hardening agent is desired to be uniformly mixed with the fluorine-containing resin composition and to keep the above-mentioned compatible state of the resin composition. The content of the component (d) is preferably in a range of from 0.1 to 5 parts by weight.

The polymerizing catalyst used as the component (d) is selected to have a function of hardening the resin composition composed of the components (a), (b) and (c). The polymerizing catalyst may be of either a thermosetting type or a photosetting type. Specific examples of the polymerizing catalyst may include boron trifluoride-amine complex, bis (4-t-butylphenyl) iodonium salt, and $Cu(CF_3SO_3)_2$. Such a polymerizing catalyst is commercially available, for example, under the trade name of SP170 (produced by Asahi Denka Kogyo K.K.).

A hardening agent used as the component (d) is selected to be of a thermosetting type functioning as a thermosetting catalyst and hardening the resin composition composed of the components (a), (b) and (c). As the hardening agent of a thermosetting catalyst type, there may be used an amine based hardening agent and an acid anhydride type hardening agent, and preferably, an amine compound containing a siloxane group or a perfluoro group, and an acid anhydride of the amine compound. Specific examples of the hardening agent may include $\alpha,\omega$-bis (3-aminopropyl) polydimethyl siloxane (trade name: TSL9346, produced by Toshiba Silicone Co., Ltd.); 1,3-bis (3-aminopropyl)-1,1,3,3-tetramethyldisiloxane (trade name: LS-7430, produced by Shin-Etsu Chemical Co. Ltd.); and 2,2-bis (4-aminophenyl)-hexafluoropropane (trade name: BIS-A-AF, produced by Central Glass Co., Ltd.).

In addition, the fluorine-containing epoxy resin composition of the present invention may contain, in addition to the components (a) to (d), a known silane coupling agent or leveling agent, as required.

Other than the above, a filler such as quartz talc or a pigment may be added, as required.

The fluorine-containing epoxy resin composition of the present invention includes two types: one having a flowability at normal temperature, and the other having no flowability at normal temperature. The fluorine-containing epoxy resin composition of a type having a flowability at normal temperature can be directly used for film formation; however, in order to make the components of the resin composition in a desirable compatible state, it is desired that the components be dissolved in a solvent and used for film formation by evaporation of the solvent. For example, in the case of forming a film of the fluorine-containing epoxy resin composition by way of a coating process, the components of the resin composition are dissolved in a solvent, and a surface of an object is coated with the solution thus obtained using a solvent coating process such as a spin coating process, followed by evaporation of the solvent, to form a high quality film on the surface of the object to a uniform thickness.

Since the fluorine-containing epoxy resin composition of the present invention can be dissolved in most of solvents commonly used for known epoxy resins, there can be used known solvents such as acetone, methylisobutyl ketone, diethyleneglycol dimethyl ether, cyclohexane. Also such a solvents are for is commercially available, for example, under the trade name of Solvesso (produced by Dainippon Ink & Chemicals, Incorporated). It is to be noted that these solvent are illustrative purposes only and are not restrictive.

The fluorine-containing epoxy resin composition of the present invention composed of the above-mentioned components can be hardened at a relatively low temperature, to form a hardened structure excellent in adhesion property, weatherability, water tightness, chemical resistance, solvent resistance, friction resistance, and liquid repellent property.

The fluorine-containing epoxy resin composition of the present invention can be suitably used for treating a specified surface of a member or device so as to impart a liquid repellent property thereto, and also it can be used for adhesively bonding members to each other. In addition, the fluorine-containing epoxy resin composition of the present invention can be used as a paint by adding and diffusing a coloring material in the resin composition.

The fluorine-containing epoxy resin composition of the present invention is particularly suitable as a material for forming a liquid repellent layer on a discharging outlet surface of an ink jet head.

Hereinafter, description will be made of an example of an ink jet head in which a discharging outlet surface is subjected to a liquid repellent finish using the fluorine-containing epoxy resin composition of the present invention.

An example of producing an ink jet head of the present invention will be described with reference to the drawings. FIGS. 1 to 12 show basic steps of producing an ink jet head. In these figures, there is shown an ink jet head having two discharging outlets; however, this is for simplification purposes only. It should be understood that the ink jet head of the invention includes a high density multi-array type ink jet head having three or more discharging outlets and also an ink jet head having only one discharging outlet.

FIG. 1 is a schematic perspective view of a substrate 1 for an ink jet head which is used for production of an ink jet head in this embodiment.

As shown in FIG. 1, there is prepared the substrate 1 formed of an appropriate material selected from silicon, glass, ceramics, plastics and metals. The substrate 1 may serve not only as an ink pathway wall-forming member but also as a support for a coating resin layer which will be described later, and it is not particularly limited in terms of shape and material thereof.

The substrate 1 is provided with a plurality of energy generating elements 2 which are spacedly arranged at equal intervals on the surface thereof. The energy generating element 2 is represented by an electrothermal converting element or piezo-electric element. In FIG. 1, there are shown only two energy generating elements, but this is for simplification purposes only. In practice, a number of energy generating elements are usually arranged on the substrate 1. Each energy generating element 2 serves to impart energy to ink in an ink pathway for discharging ink in a droplet from a discharging outlet so as to provide an image on a printing medium such as a paper. In particular, in the case where an electrothermal converting element is used as the energy generating element 2, the electrothermal converting element generates thermal energy to heat ink in the vicinity thereof, thereby causing a state change for the ink to form a bubble, wherein energy generated based on a pressure change caused upon the formation of the bubble effects as discharging energy to result in discharging ink in a droplet from a discharging outlet. In the case where a piezo-electric element is used as the energy generating element, energy caused by the mechanical vibration of the piezo-electric element effects as discharging energy to discharge ink in a droplet from a discharging outlet.

In any case, the energy generating element 2 includes a control signal inputting electrode electrically connected thereto (not shown).

The substrate 1 may contain a proper functional layer, disposed on the energy generating element 2, for improving the durability thereof.

In addition, as shown in FIG. 1, the substrate 1 is provided with an ink supply port 3 comprising a through hole which is disposed at a position of the substrate where no energy generating element is present.

Figure 2:
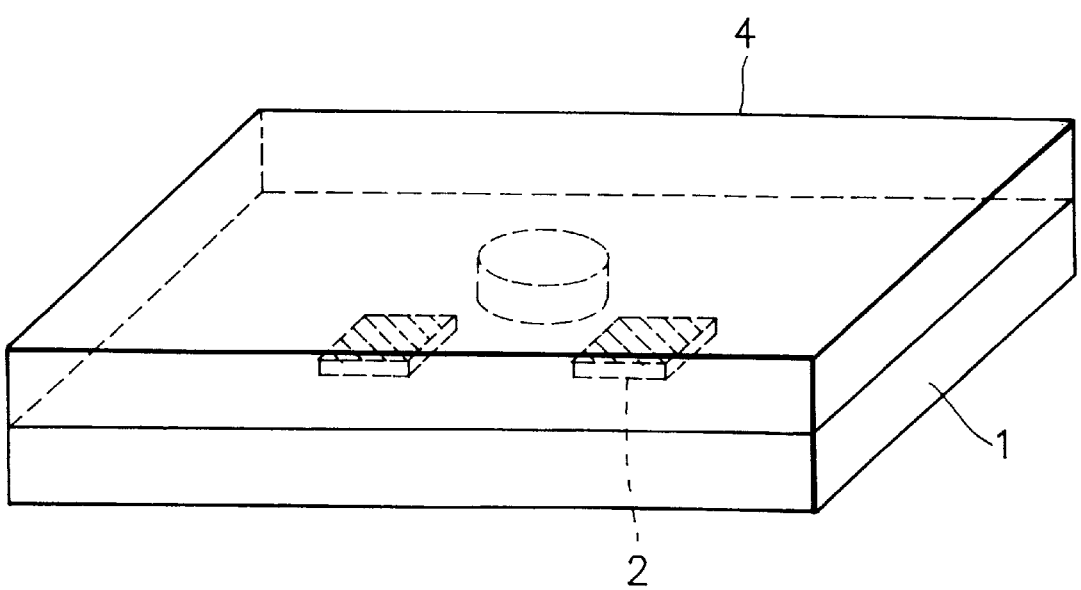

Then, as shown in FIG. 2, a photosensitive resin layer 4 is formed on the substrate 1 for an ink jet head in a manner to cover the energy generating elements 2 disposed on the substrate 1. The photosensitive resin layer 4 may be formed of a positive type photosensitive resin in view of patterning characteristic and solubility. The formation of the photosensitive resin layer 4 may be conducted by a manner of providing a solution of the photosensitive resin dissolved in a given solvent, applying the solution on a proper film such as a PET film to form a liquid coat on the film, converting the liquid coat on the film into a dry film, and transferring the dry film onto the substrate 1 for an ink jet head by using a laminator.

Alternatively, the formation of the photosensitive resin layer 4 may be conducted by means of the solvent-coating process such as a spin coating or roll coating process. In this formation process, the ink supply port 3 is formed by anisotropic etching in a state in which a coating resin layer 6 is provided on the substrate 1.

Figure 3:
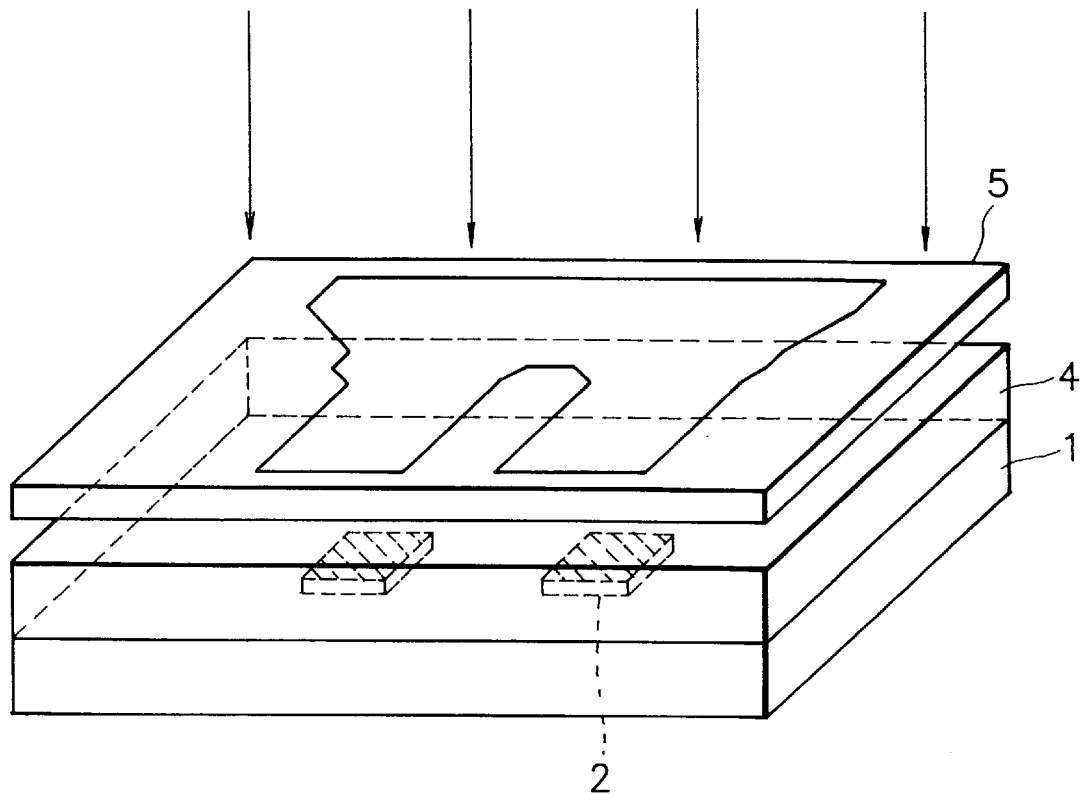
Figure 4:
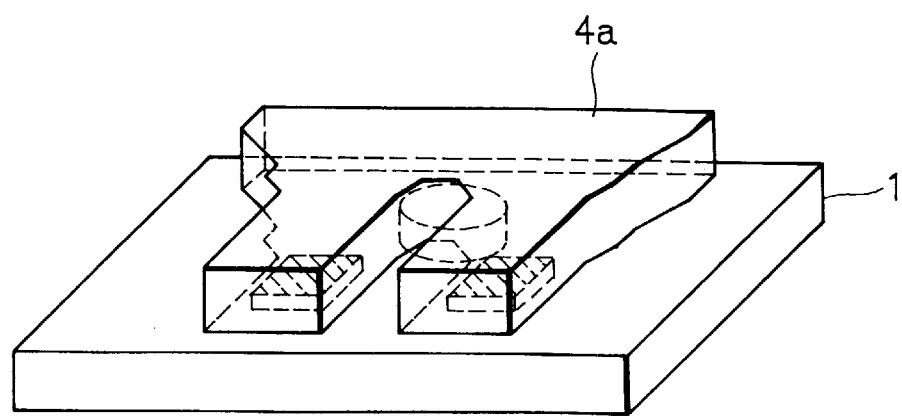

Then, as shown in FIG. 3, a patterning mask 5 is superposed on the surface of the photosensitive resin layer 4, and active energy radiation such as ultraviolet radiation or ionizing radiation is irradiated onto the photosensitive resin layer 4 using a patterning mask 5 having a pattern allowing the irradiation for a predetermined portion which does not contribute to the formation of an ink pathway to solubilize the predetermined portion, followed by eluting with the use of a solvent to remove the predetermined portion, thereby forming an ink pathway-forming pattern 4a as shown in FIG. 4. The ink pathway-forming pattern 4a is comprised of the non-solubilized photosensitive resin. The ink pathway-forming pattern 4a contributes to the formation of an ink pathway provided with the ink supply port 3 and energy generating elements 2 (see FIG. 4).

Figure 5:
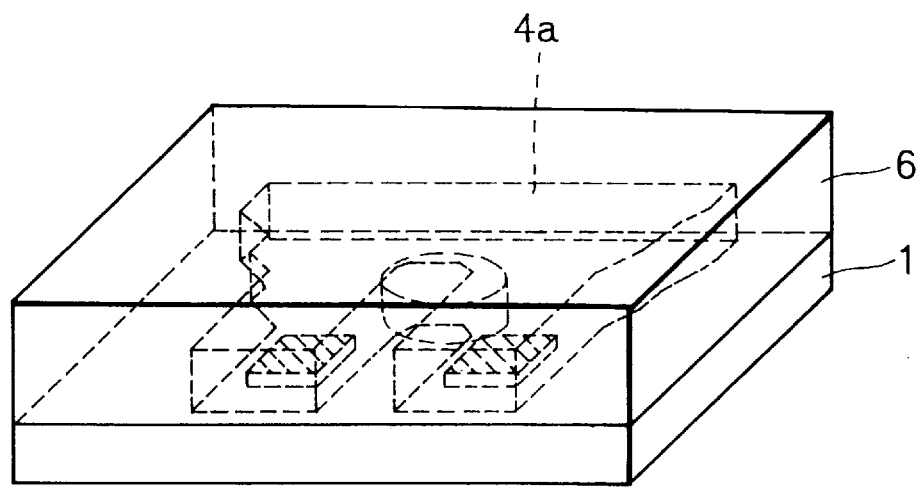

After the formation of the ink pathway-forming pattern 4a, as shown in FIG. 5, a coating resin layer 6 is formed on the ink pathway-forming pattern 4a in a manner to cover the ink pathway-forming pattern 4a. The coating resin layer 6 serves as a structural member of an ink jet head, and therefore, it is required to have sufficient mechanical strength, heat resistance, adhesion property to the substrate 1, and resistance to ink. As the constituent material of the coating resin layer 6 which satisfies these requirements, there can be used hardening resins such as epoxy resin, acrylic resin, diglycol dialkylcarbonate resin, unsaturated polyester resin, diarylphthalate resin, polyurethane resin, polyimide resin, melamine resin, phenol resin, and urea resin. These hardening resins are used together with a conventional hardening agent upon forming the coating resin layer. If necessary, it is possible to use light or thermal energy in order to harden any of these hardening resins by which the coating resin layer is constituted.

The formation of the coating resin layer 6 may be conducted by a manner of providing a solution of any of the above hardening resins dissolved in a given solvent and applying the solution onto the ink pathway-forming pattern 4a by the solvent-coating process or another manner of heat-fusing any of the above hardening resins to obtain a fused resin and applying the fused resin onto the ink pathway-forming pattern by way of transfer molding.

After the formation of the coating resin layer 6, discharging outlets are formed in the coating resin layer by way of lithography. The formation of the discharging outlets may be conducted, for example, in the following manner.

Figure 6:
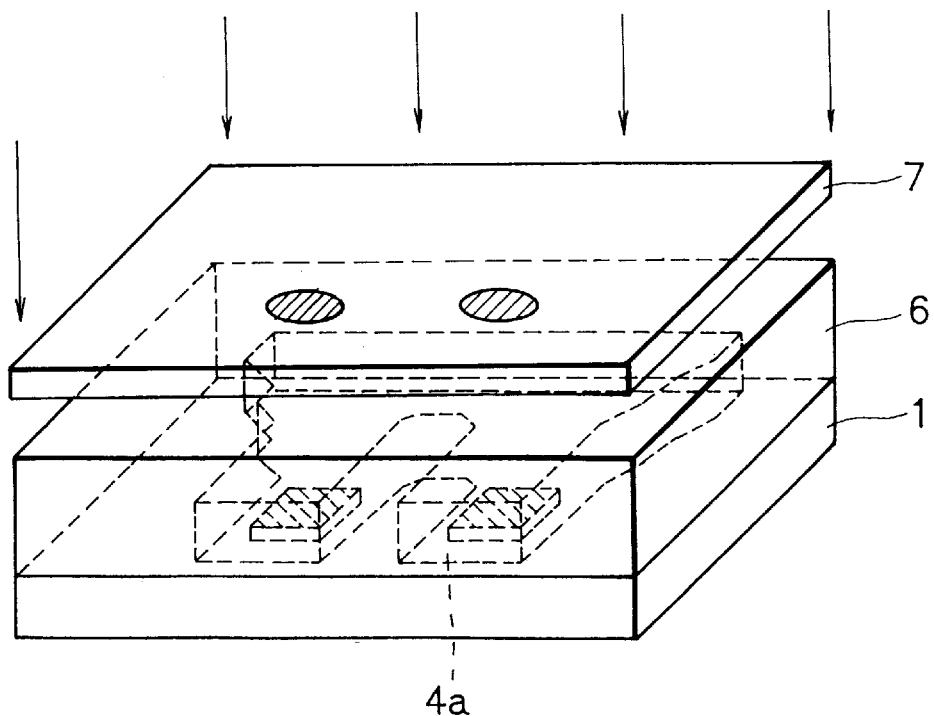
Figure 7:
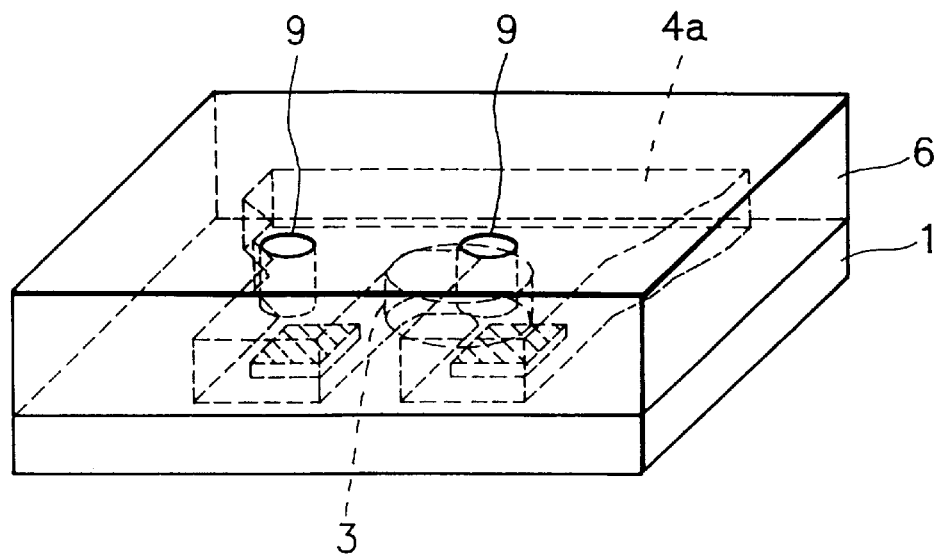

That is, in the case of forming the discharging outlets by photolithography, the coating resin layer is constituted by a hardening resin having a negative photosensitive property. Then, as shown in FIG. 6, the coating resin layer 6 is subjected to light exposure through a discharging outlet-forming patterning mask 7 having shielding portions for forming discharging outlets. The coating resin layer is thus hardened except for its shielded portions to form a discharging outlet-forming pattern in the coating resin later, wherein the discharging outlet-forming pattern comprises non-hardened portions based on the shielded portions and the remaining portion of the coating resin layer is hardened. Thereafter, as shown in FIG. 7, the non-hardened portions are removed by eluting them with the use of a solvent, thereby forming discharging outlets 9 in the coating resin layer 6.

In this embodiment, the formation of the discharging outlets is conducted before the solubilization of the ink pathway-forming portion of the photosensitive resin layer 4. This is due to the fact that since the coating resin layer is constituted by the negative type photosensitive resin, if the irradiation of ionizing radiation to the ink pathway-forming portion of the photosensitive layer 4 should be conducted in advance of the formation of the discharging outlets, the discharging outlet-forming portions of the coating resin layer 6 are hardened so that no discharging outlet can be formed.

In this embodiment, the ink discharging outlets 9 are formed using photolithography; however, they may be formed by a manner of superposing a mask having a discharging outlet-forming pattern on the coating resin layer, followed by irradiation by excimer laser beam or dry etching using oxygen plasma. In addition, in the case where discharging outlets are formed using oxygen plasma or excimer laser, it is necessary to harden the coating resin layer.

Figure 8:
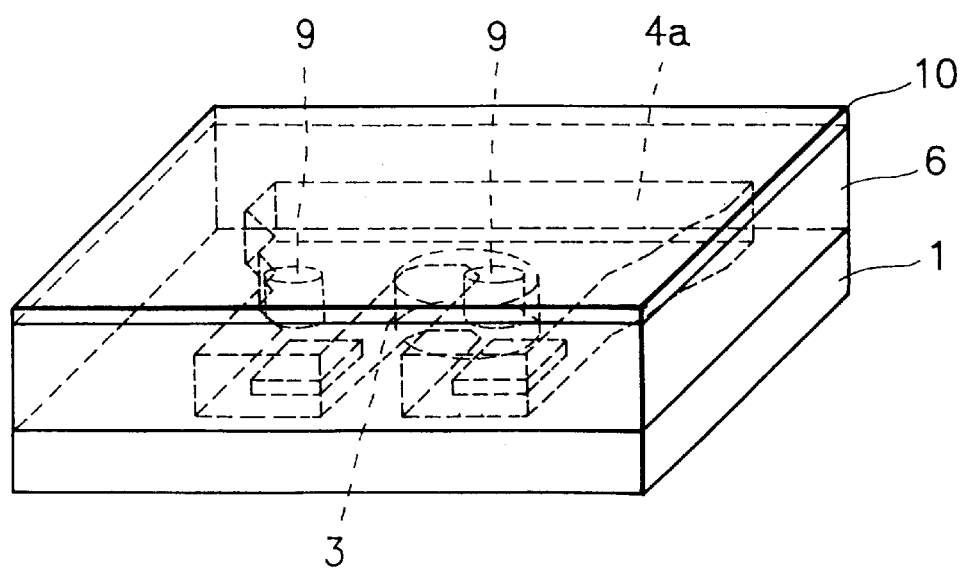

Then, as shown in FIG. 8, in order to form a liquid repellent layer on the discharging outlet surface, a liquid repellent agent composed of the fluorine-containing epoxy resin composition of the present invention is applied on the coating resin layer 6 provided with the discharging outlets (discharging outlet surface) by way of a solvent coating process such as a spin coating process, to form a liquid repellent layer 10.

The liquid repellent layer 10 is then patterned for locally imparting a liquid repellent function only on neighborhoods of the discharging outlets. The patterning of the liquid repellent layer 10 can be conducted by photolithography, and for this purpose, a photo-polymerizing catalyst is used as the component (d) of the fluorine-containing epoxy resin composition. The patterning of the liquid repellent layer by photolithography is conducted, for example, in the following manner.

Figure 9:
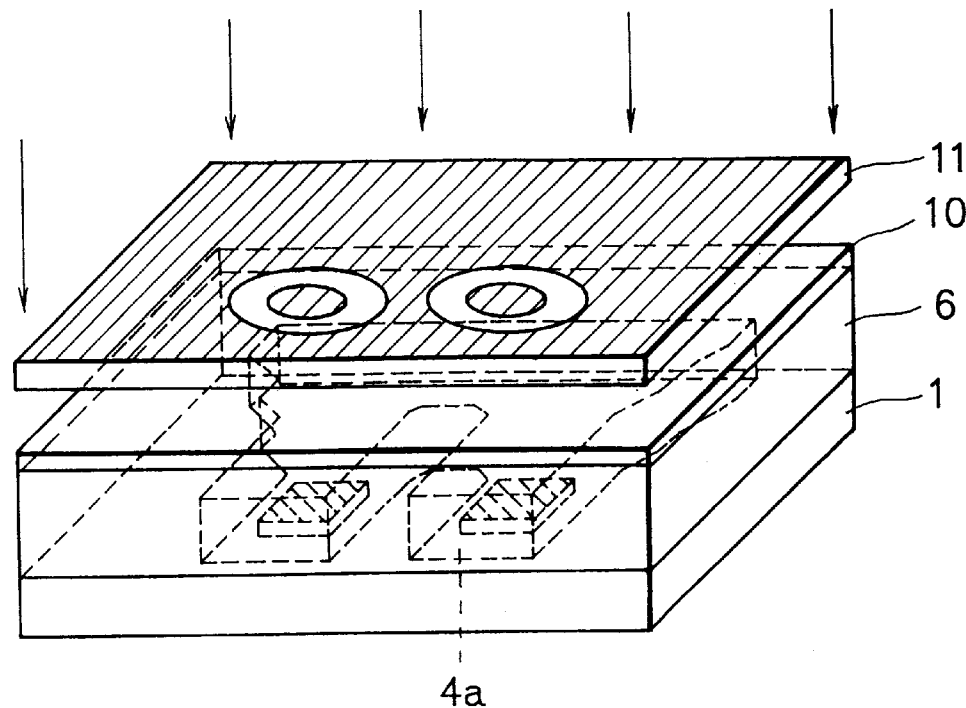
Figure 10:
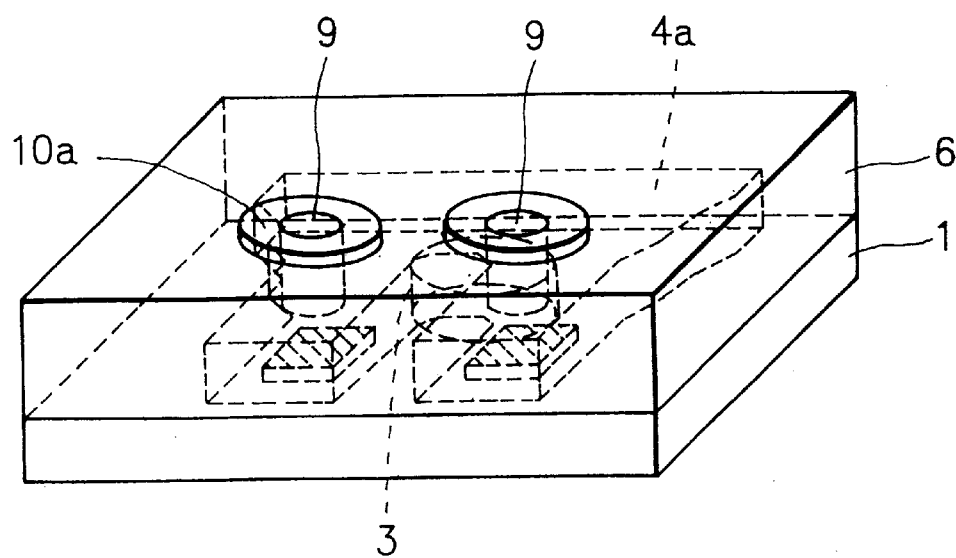

First, as shown in FIG. 9, the liquid repellent layer having a negative photosensitive characteristic is exposed through a patterning mask 11 having such a pattern as to allow active energy radiation to pass through only the neighborhoods of the discharging outlets. The exposed portion of the liquid repellent layer 10 is hardened, so that the other portion than the neighborhoods of the discharging outlets is patterned in a desired state. Then, as shown in FIG. 10, the non-exposed portion of the liquid repellent layer 10 is eluted by a solvent, to form a liquid repellent pattern 10a extended only on the neighborhoods of the discharging outlets.

Figure 11:
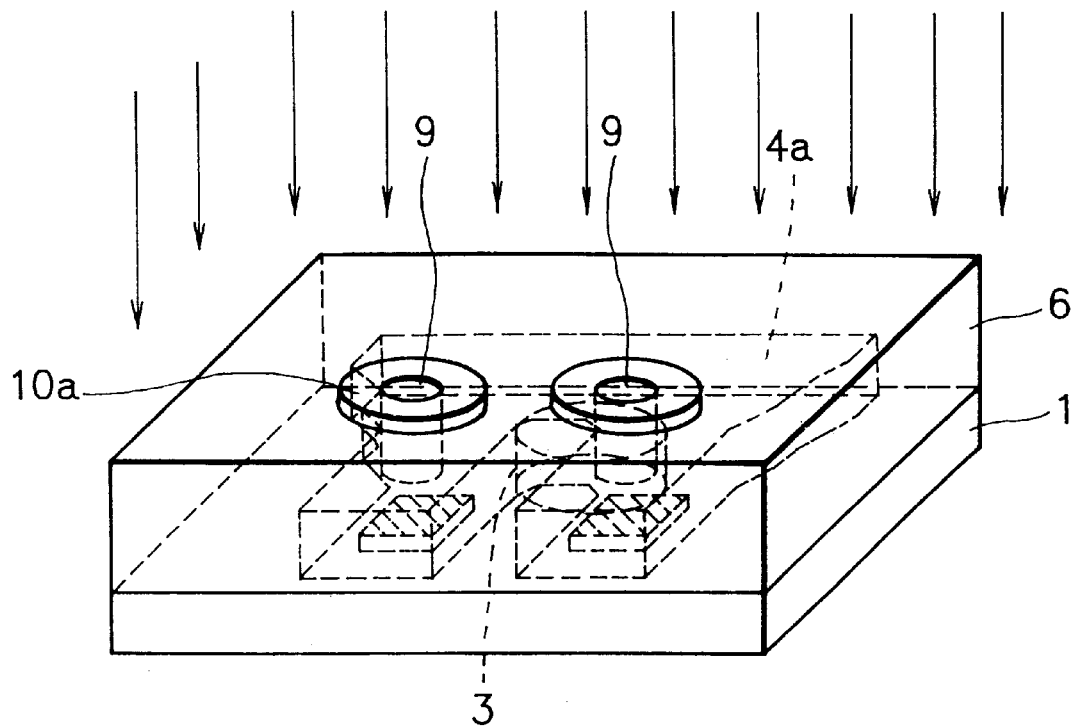

Next, as shown in FIG. 11, ionizing irradiation is irradiated on the ink pathway-forming portion 4a through the liquid repellent pattern 10a and the coating resin layer 6, to solubilize the ink pathway-forming portion 4a.

Finally, the ink pathway-forming pattern 4a thus solubilized is eluted with a solvent, to form an ink pathway 8. An ink jet head shown in FIG. 12 is thus obtained.

In the above, description has been made of the case of providing the side shooter type ink jet head. However, it is a matter of course that the present invention can be employed also for production of an ink jet head of the edge shooter type of discharging ink in the direction along the face on which energy generating elements are arranged. In the case where the present invention is employed for production of the edge shooter type ink jet head, discharging outlets are formed at an end portion of the substrate for an ink jet head having the coating resin layer formed thereon and therefore, the above discharging outlet-forming step is not necessary to be conducted.

In the ink jet head of this embodiment, the hardened layer (liquid repellent pattern) of the hardened fluorine-containing epoxy resin composition is locally provided on the discharging outlet surface at least at neighborhoods of the discharging outlets, so that the neighborhoods of the discharging outlets are given a liquid repellent property, and accordingly, it is possible to prevent droplets (ink droplets) from adhering on the discharging outlet surface and hence to prevent deviation of the discharging direction of ink. Also, the hardened layer is excellent in adhesion property. In addition, a fine liquid repellent pattern can be formed only on the neighborhoods of the discharging outlets using the fluorine-containing epoxy resin composition of the present invention.

Figure 12:
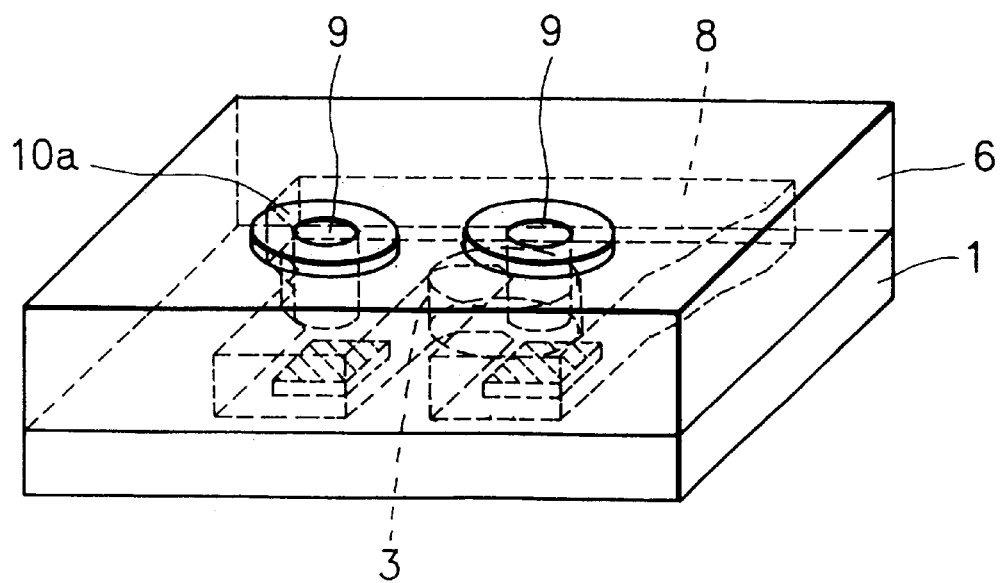
Figure 13:
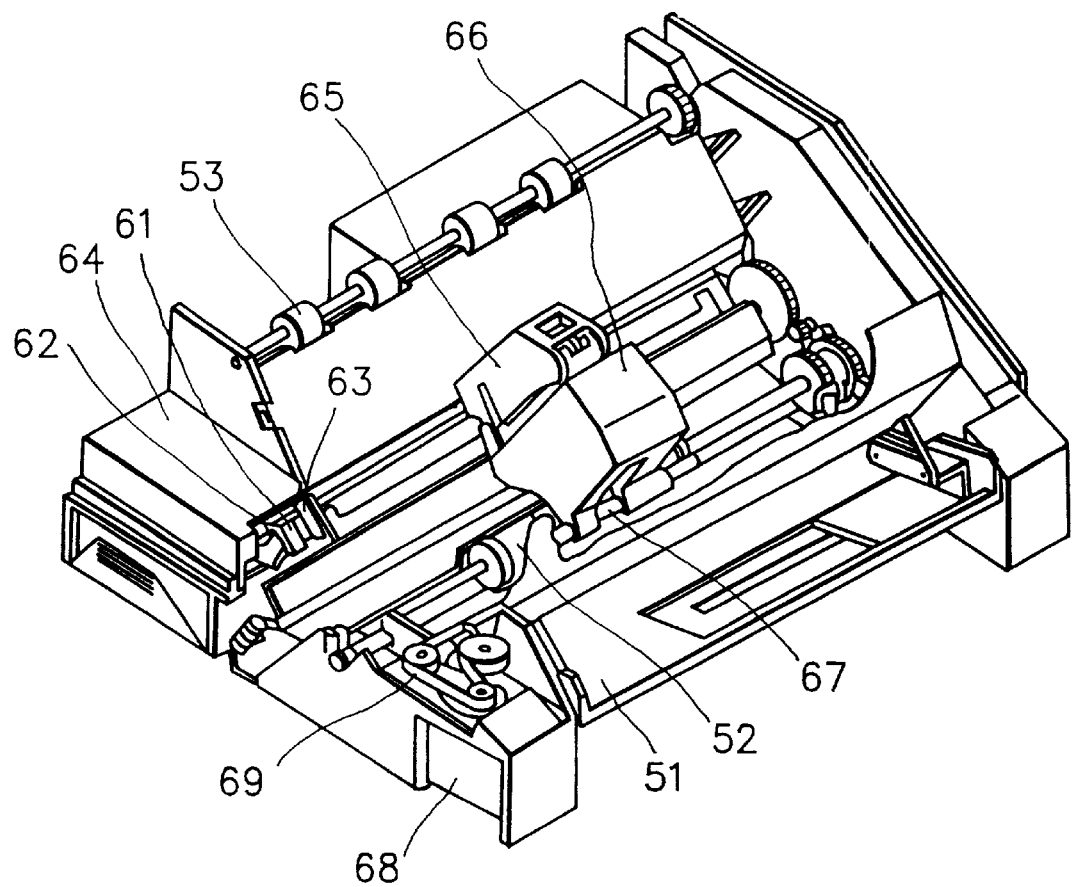
FIG. 13 is a view showing one example of an ink jet system in which the ink jet head having the configuration shown in FIG. 12 is incorporated.
Figure 14:
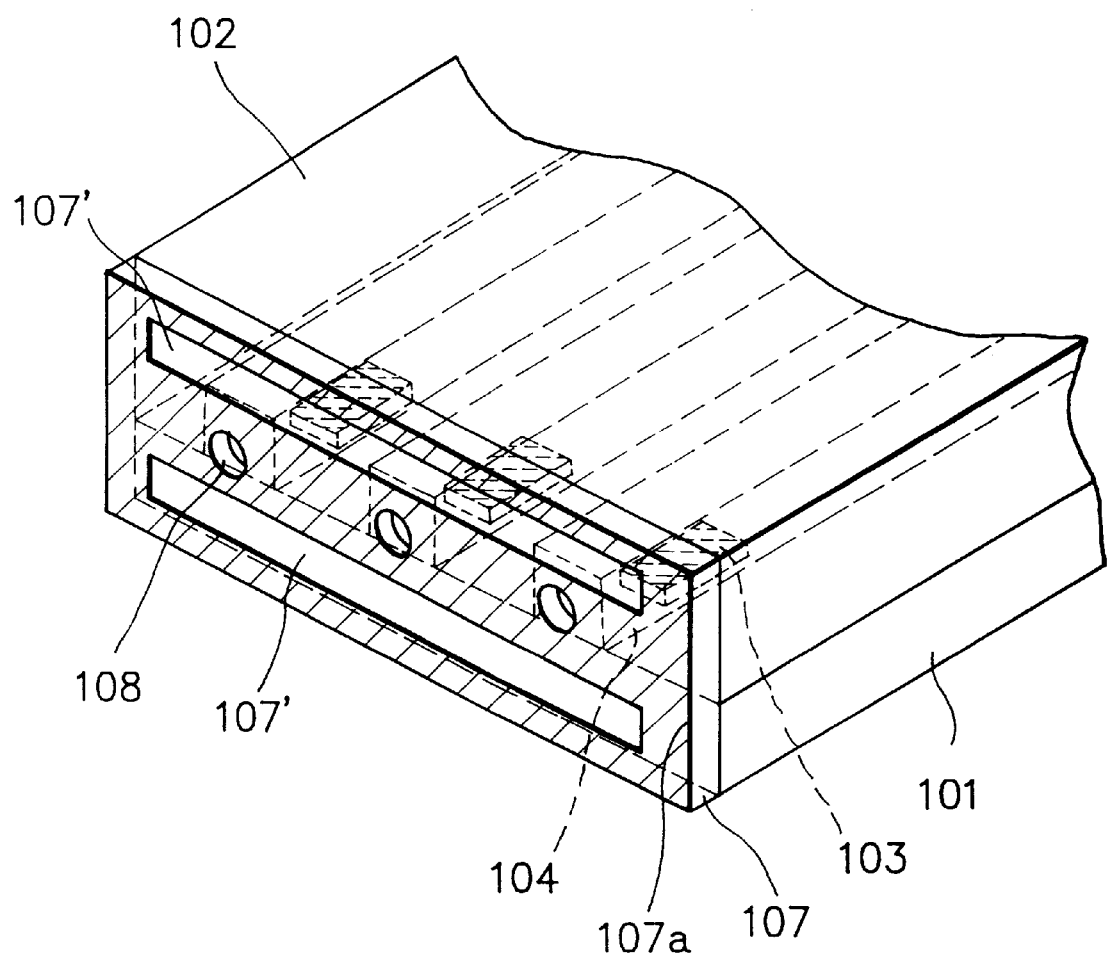
FIG. 14 is a schematic view showing one example of an ink jet head in which a discharging outlet surface is subjected to a liquid repellent treatment using a known liquid repellent agent.

FIG. 13 shows one example of an ink jet system in which an ink jet head having the configuration shown in FIG. 12 is incorporated. In FIG. 13, reference numeral 61 indicates a blade as a wiping member, which is held in a cantilever manner with one end fixedly held on a blade holding member. The blade 61 is disposed at a position adjacent to a printing region from an ink jet head 65, and is held in a manner to project in a movement path of the ink jet head 65.

Reference numeral 62 indicates a cap disposed at a home position adjacent to the blade 61, which is moved in the direction perpendicular to the movement direction of the ink jet head 65 so as to be abutted on the discharging outlet surface for capping it. Reference numeral 63 indicates an ink absorber provided adjacently to the blade 61, which is held in a manner to project in the moving path of the ink jet head 65 like the blade 61. The blade 61, cap 62, and the ink absorber 63 serve to remove water content, dust and the like from the ink discharging outlet surface.

The ink jet head 65 is configured to discharge recording liquid (ink) by thermal energy. Reference numeral 66 indicates a cartridge for moving the ink jet head 65 mounted thereon. The cartridge 66 is movable along a guide shaft 67 to the printing region in which printing is conducted by the ink jet head 65 and to the resin adjacent thereto.

Reference numeral 51 indicates a paper feeder in which a printing medium is inserted, and 52 indicates a paper feed roller driven by a motor (not shown). With this configuration, the printing medium is fed to a position opposed to the discharging outlet surface of the ink jet head 65, and is discharged by means of a discharging roller 53 as the printing proceeds.

With this configuration, when the ink jet head 65 is returned to the home position after completion of printing or the like, the cap 62 of a head recovery unit 64 is retreated from the moving path of the ink jet head 65, but the blade 61 projects in the moving path for wiping the discharging outlet surface of the ink jet head 65. When the cap 62 is abutted on the discharging outlet surface of the ink jet head 65 for capping it, it is moved so as to project in the moving path of the ink jet head 65.

When the ink jet head 65 is moved from the home position to the printing starting position, the cap 62 and the blade 61 are located at the same positions as those upon wiping operation. As a result, even at such a movement of the ink jet head 65, the discharging outlet surface of the ink jet head 65 is wiped. The ink jet head 65 is moved to the home position not only after completion of recording and in the stand-by condition for discharging recovery but also at specified intervals during movement in the printing region for printing.

Color printing is conducted using an ink jet head having discharging outlets for cyan, magenta, yellow, and black which are arranged in parallel to each other, or using ink jet heads for cyan, magenta, yellow and black which are arranged in parallel to each other. In this case, the discharging of each color ink may be conducted only through one discharging outlet or the discharging of respective color inks may be conducted through a plurality of discharging outlets so as to allow the droplets having two or more of color inks to be simultaneously shot on a printing medium.

EXPERIMENTS

Hereinafter, there will be described main parts of experiments which have been conducted by the present inventors in the course of finding the above-mentioned fluorine-containing epoxy resin composition of the present invention. Sample Nos. 1 to 20 were each prepared in Experiments 1 to 20, and were examined in usability on the basis of the measured results regarding the hardness, liquid repellent property, adhesion property, film formability, and flowability before hardening.

In addition, a plurality of specimens were prepared for each of Sample Nos. 1 to 20 corresponding to Experiments 1 to 20.

Experiment 1

First, there was prepared a coating solution by dissolving, in methylisobutyl ketone, 50 parts by weight of a bisphenol A type epoxy resin "Epikote 828" (trade name, produced by Yuka Shell Epoxy Kabushiki Kaisha) as the component (a); 20 parts by weight of 3-(2-perfluorohexyl) ethoxy-1,2-epoxypropane "MF-120" (trade name, produced by TOHKEM PRODUCT CORPORATION) as the component (b); 30 parts by weight of 1,3-bis (glycidoxypropyl) tetramethyldisiloxane "LS7970" (trade name, produced by Shin-Etsu Chemical Co., Ltd.) as a component (c); and 1.5 parts by weight of a photo-polymerizing initiator "SP-170" (trade name, produced by Asahi Denka Kogyo K. K.) as the component (d), to prepare a methylisobutyl ketone solution in a concentration of 50 wt %. The resultant methylisobutyl ketone solution in an amount of 2 cc was dropped on a circular Si wafer having a diameter of 5 inches, followed by spin coating at a rotating speed of 600 rpm for 80 seconds, to coat the Si wafer with the methylisobutyl ketone solution. The Si wafer was dried at 80° C. for 15 minutes, being exposed to ultraviolet radiation at an exposure condition of 8 J/cm$^2$, and was thermally cured at 180° C. for one hour, to thus obtain Sample 1. In addition, as a result of observation of the sample in a state directly after the drying treatment, the sample was found to have flowablity.

Experiment 2

In this experiment, Sample 2 was prepared in the same manner as that of Experiment 1, except that 55 parts by weight of an alicyclic type epoxy resin "CY179" (trade name, produced by Ciba-Geigy, Ltd.) was used as the component (a); 16 parts by weight of the 3-(2-perfluorohexyl) ethoxy-1,2-epoxypropane "MF-120" (trade name, produced by TOHKEM PRODUCT CORPORATION) was used as the component (b); and 21 parts by weight of 1,4-bis (hexaflouro-2-hydroxyl-2-propyl) benzene "1,4-HFAB" (trade name, produced Central Glass Co., Ltd.). In addition, as a result of observation of the sample in a state directly after the drying treatment, the sample was found to have flowablity.

Experiment 3

In this experiment, Sample 3 was prepared in the same manner as that of Experiment 1, except that 70 parts by weight of the alicyclic type epoxy resin "CY179" (trade name, produced by Ciba-Geigy, Ltd.) was used as the component (a); 10 parts by weight of the 3-(2-perfluorohexyl) ethoxy-1,2-epoxypropane "MF-120" (trade name, produced by TOHKEM PRODUCT CORPORATION) was used as the component (b); 20 parts by weight of 2,2-bis [p-(2,3-epoxypropoxy) phenyl]-1,1,1,3,3,3-hexafluoropropane "CHEMINOX AFEp" (trade name, produced by Nippon Mektron, Ltd.) was used as the component (c). In addition, as a result of observation of the sample in a state directly after the drying treatment, the sample was found to have flowablity.

Experiment 4

In this experiment, Sample 4 was prepared in the same manner as that of Experiment 1, except that 34 parts by weight of alicyclic type epoxy resin "EHPE-3158" (trade name, produced by Daicel Chemical Industries, Ltd.) was used as the component (a); 16 parts by weight of the 3-(2-perfluorohexyl) ethoxy-1,2-epoxypropane "MF-120" (trade name, produced by TOHKEM PRODUCT CORPORATION) was used as the component (b); and 25 parts by weight of the 2,2-bis [p-(2,3-epoxypropoxy) phenyl]-1,1,1,3,3,3-hexafluoropropane "CHEMINOX AFEp" (trade name, produced by Nippon Mektron, Ltd.) and 25 parts by weight of the 1,4-bis (hexaflouro-2-hydroxyl-2-propyl) benzene "1,4-HFAB" (trade name, produced by Central Glass Co., Ltd.) were used as the component (c). In addition, as a result of observation of the sample in a state directly after the drying treatment, the sample was found to lose flowablity.

Experiment 5

First, there was prepared a coating solution by dissolving, in methylisobutyl ketone, 34 parts by weight of the alicyclic type epoxy resin "EHPE-3158" (trade name, produced by Daicel Chemical Industries, Ltd.) as the component (a); 16 parts by weight of N-propyl-N-(2,3-epoxypropyl) perfluorooctanesulfonamide "MF-130" (trade name, produced by TOHKEM PRODUCT CORPORATION) as the component (b); 25 parts by weight of the 1,4-bis (hexaflouro-2-hydroxyl-2-propyl) benzene "1,4-HFAB" (trade name, produced by Central Glass Co., Ltd.) and 25 parts by weight of the 1,3-bis (glycidoxypropyl) tetramethyldisiloxane "LS7970" (trade name, produced by Shin-Etsu Chemical Co., Ltd.) as a component (c); and 1 part by weight of a thermosetting catalyst $Cu(CF_3SO_3)_2$ as the component (d), to prepare a methylisobutyl ketone solution in a concentration of 50 wt %. The resultant methylisobutyl ketone solution in an amount of 2 cc was dropped on a circular Si wafer having a diameter of 5 inches, followed by spin coating at a rotating speed of 600 rpm for 80 seconds, to coat the Si wafer with the methylisobutyl ketone solution. The Si wafer was dried at 80° C. for 15 minutes, being exposed to ultraviolet radiation at an exposure condition of 8 J/cm$^2$, and was thermally cured at 180° C. for one hour, to thus obtain Sample 1. In addition, as a result of observation of the sample in a state directly after the drying treatment, the sample was found to have flowablity.

Experiment 6

In this experiment, Sample 6 was prepared in the same manner as that of Experiment 4, except that 1 part by weight of the thermosetting catalyst $Cu(CF_3SO_3)_2$ was used as the component (d), and the exposure step for the sample was omitted. In addition, as a result of observation of the sample in a state directly after the drying treatment, the sample was found to lose flowablity.

Experiment 7

In this experiment, Sample 7 was prepared in the same manner as that of Experiment 4, except that 20 parts by weight of the 2,2-bis [p-(2,3-epoxypropoxy) phenyl]-1,1,1,3,3,3-hexafluoropropane "CHEMINOX AFEp" (trade name, produced by Nippon Mektron, Ltd.) and 30 parts by weight of flourohexanediol were used as the component (c). In addition, as a result of observation of the sample in a state directly after the drying treatment, the sample was found to lose flowablity.

Experiment 8

In this experiment, Sample 8 was prepared in the same manner as that of Experiment 1, except that 40 parts by weight of the bisphenol A type epoxy resin "Epikote 828" (trade name, produced by Yuka Shell Epoxy Kabushiki Kaisha) was used as the component (a); 20 parts by weight of the 2,2-bis [p-(2,3-epoxypropoxy) phenyl]-1,1,1,3,3,3-hexafluoropropane "CHEMINOX AFEp" (trade name, produced by Nippon Mektron, Ltd) and 20 parts by weight of the 1,3-bis (glycidoxypropyl) tetramethyldisiloxane "LS7970" (trade name, produced by Shin-Etsu Chemical Co., Ltd.) were used as the component (c). In addition, as a result of observation of the sample in a state directly after the drying treatment, the sample was found to have flowablity.

Experiment 9

In this experiment, the components (a) and (b) were not used. First, there was prepared a coating solution by dissolving, in methylisobutyl ketone, 100 parts by weight of the 2,2-bis [p-(2,3-epoxypropoxy) phenyl]-1,1,1,3,3,3-hexafluoropropane "CHEMINOX AFEp (trade name, produced by Nippon Mektron, Ltd.) as the component (c) and 1.5 parts by weight of the photo-polymerizing initiator "SP-170" (trade name, produced by Asahi Denka Kogyo K. K.) as the component (d), to prepare a methylisobutyl ketone solution in a concentration of 50 wt %. Then, using the resultant methylisobutyl ketone solution, Sample 9 was prepared in the same coating and hardening conditions as those in Experiment 1. In addition, as a result of observation of the sample in a state directly after the drying treatment, the sample was found to have flowablity.

Experiment 10

In this experiment, the components (a) and (c) were not used. First, there was prepared a coating solution by dissolving, in methylisobutyl ketone, 100 parts by weight of the 3-(2-perfluorohexyl) ethoxy-1,2-epoxypropane "MF-120" (trade name, produced by TOHKEM PRODUCT CORPORATION) as the component (b) and 1.5 parts by weight of the photo-polymerizing initiator "SP-170" (trade name, produced by Asahi Denka Kogyo K. K.) as the component (d), to prepare a methylisobutyl ketone solution in a concentration of 50 wt %. Then, using the resultant methylisobutyl ketone solution, Sample 10 was prepared in the same coating and hardening conditions as those in Experiment 1. In addition, as a result of observation of the sample in a state directly after the drying treatment, the sample was found to have flowablity.

Experiment 11

In this experiment, the component (a) was not used. First, there was prepared a coating solution by dissolving, in methylisobutyl ketone, 20 parts by weight of the 3-(2-perfluorohexyl) ethoxy-1,2-epoxypropane "MF-120" (trade name, produced by TOHKEM PRODUCT CORPORATION) as the component (b); 80 parts by weight of the 1,3-bis (glycidoxypropyl) tetramethyldisiloxane "LS7970" (trade name, produced by Shin-Etsu Chemical Co., Ltd.) as the component (c); and 1.5 parts by weight of the photo-polymerizing initiator "SP-170" (trade name, produced by Asahi Denka Kogyo K. K.) as the component (d), to prepare a methylisobutyl ketone solution in a concentration of 50 wt %. Then, using the resultant methylisobutyl ketone solution, Sample 11 was prepared in the same coating and hardening conditions as those in Experiment 1. In addition, as a result of observation of the sample in a state directly after the drying treatment, the sample was found to have flowablity.

Experiment 12

In this experiment, the component (c) was not used. First, there was prepared a coating solution by dissolving, in methylisobutyl ketone, 84 parts by weight of the produced by Daicel Chemical Industries, Ltd.) as the component (a); 16 parts by weight of the 3-(2-perfluorohexyl) ethoxy-1,2-epoxypropane "MF-120" (trade name, produced by TOHKEM PRODUCT CORPORATION) as the component (b); and 1.5 parts by weight of the photo-polymerizing initiator "SP-170" (trade name, produced by Asahi Denka Kogyo K. K.) as the component (d), to prepare a methylisobutyl ketone solution in a concentration of 50 wt %. Then, using the resultant methylisobutyl ketone solution, Sample 12 was prepared in the same coating and hardening conditions as those in Experiment 1. In addition, as a result of observation of the sample in a state directly after the drying treatment, the sample was found to have flowablity.

Experiment 13

In this experiment, Sample 13 was prepared using only a photo radical polymerization type liquid repellent agent "DEFENSA7710" (trade name, produced by Dainippon Ink & Chemicals, Incorporated) in the same coating and drying conditions as those in Experiment 1. In addition, as a result of observation of the sample in a state directly after the drying treatment, the sample was found to lose flowablity.

Experiment 14

In this experiment, Sample 14 was prepared using only a solvent drying type liquid repellent agent composed of a polymer having a fluorine-containing heterocyclic structure at a main chain "CTX-805A" (trade name, produced by Asahi Glass Co., Ltd.) in the same coating and drying conditions as those in Experiment 1. In addition, as a result of observation of the sample in a state directly after the drying treatment, the sample was found to lose flowablity.

Experiment 15

In this experiment, Sample 15 was prepared in the same manner as that of Experiment 4, except that 5 parts by weight of the 3-(2-perfluorohexyl) ethoxy-1,2-epoxypropane "MF-120" (trade name, produced by TOHKEM PRODUCT CORPORATION) was used as the photo radical polymerization component (b); 31 parts by weight of the 2,2-bis [p-(2,3-epoxypropoxy) phenyl]-1,1,1,3,3,3-hexafluoropropane "CHEMINOX AFEp" (trade name, produced by Nippon Mektron, Ltd.) was used as the component (c); and 30 parts by weight of the 1,4-bis (hexaflouro-2-hydroxyl-2-propyl) benzene "1,4-HFAB" (trade name, produced by Central Glass Co., Ltd.) was used as the component (d). In addition, as a result of observation of the sample in a state directly after the drying treatment, the sample was found to lose flowablity.

Experiment 16

In this experiment, Sample 16 was prepared in the same manner as that of Experiment 4, except that 5 parts by weight of the alicyclic type epoxy resin "EHPE-3158" (trade name, produced by Daicel Chemical Industries, Ltd.) was used as the component (a) and 54 parts by weight of the 2,2-bis [p-(2,3-epoxypropoxy) phenyl]-1,1,1,3,3,3-hexafluoropropane "CHEMINOX AFEp" (trade name, produced by Nippon Mektron, Ltd.) was used as the component (c). In addition, as a result of observation of the sample in a state directly after the drying treatment, the sample was found to have flowablity.

Experiment 17

In this experiment, Sample 17 was prepared in the same manner as that of Experiment 4, except that 15 parts by weight of the alicyclic type epoxy resin "EHPE-3158" (trade name, produced by Daicel Chemical Industries, Ltd.) was used as the component (a) and 44 parts by weight of the 2,2-bis [p-(2,3-epoxypropoxy) phenyl]-1,1,1,3,3,3-hexafluoropropane "CHEMINOX AFEp" (trade name, produced by Nippon Mektron, Ltd.) was used as the component (c). In addition, as a result of observation of the sample in a state directly after the drying treatment, the sample was found to have flowablity.

Experiment 18

In this experiment, Sample 18 was prepared in the same manner as that of Experiment 1, except that 46 parts by weight of the alicyclic type epoxy resin "CY179" (trade name, produced by Ciba-Geigy, Ltd.) was used as the component (a) and 10 parts by weight of the 1,3-bis (glycidoxypropyl) tetramethyldisiloxane "LS7970" (trade name, produced by Shin-Etsu Chemical Co., Ltd.) was used as the component (c). In addition, as a result of observation of the sample in a state directly after the drying treatment, the sample was found to have flowablity.

Experiment 19

In this experiment, Sample 19 was prepared in the same manner as that of Experiment 4, except that 16 parts by weight of the 3-(2-perfluorohexyl) ethoxy-1,2-epoxypropane "MF-120" (trade name, produced by TOHKEM PRODUCT CORPORATION) as the component (b) in Experiment 4 was replaced with 16 parts by weight of 2-perfluorooctaneethylacrylate "CHNIMOX FAAC" (trade name, produced by Nippon Mektron, Ltd.). In addition, as a result of observation of the sample in a state directly after the drying treatment, the sample was found to have flowablity.

Experiment 20

In this experiment, Sample 20 was prepared in the same manner as that of Experiment 1, except that 20 parts by weight of Sefral Coat A-101B (trade name, produced by Central Glass Co., Ltd.) was used as the component (b) in place of the 3-(2-perfluorohexyl) ethoxy-1,2-epoxypropane "MF-120" (trade name, produced by TOHKEM PRODUCT CORPORATION). In addition, as a result of observation of the sample in a state directly after the drying treatment, the sample was found to have flowablity.

EVALUATION

Sample Nos. 1 to 20 obtained in Experiments 1 to 20 were evaluated in the following manner in terms of hardness, liquid repellent property, adhesion property, and film formability. The results are shown in Table 1.
(1) Evaluation of Hardness:

The hardness of each sample was examined by a manner of placing a PPC copy paper (produced by CANON INC.) on each sample, rubbingly reciprocating the copy paper on the sample 10 times in a state that a load of 500 gf/cm$^2$ is applied on the copy paper, and observing the surface state of the sample with a microscope. The evaluated results on the basis of the following reference are shown in Table 1.
(Evaluation Reference)
⊚: no damage
○: micro-damage not visible, slightly observed
Δ: visible damage
×: separation of film from substrate
(2) Evaluation of Liquid Repellent Property:

The liquid repellent property of each sample was examined by dropping a black ink for BJC4000 produced by CANON INC. on the sample in an amount of 0.1 cc, erecting the substrate of the sample, and visually evaluating whether or not ink remains on the sample. The evaluated results on the basis of the following reference are shown in Table 1.
(Evaluation Reference)
⊚: ink immediately dropped
○: ink not immediately dropped but thereafter entirely dropped
×: ink remaining on the sample
(3) Evaluation of Adhesion Property Each sample was subjected to an ink immersion (PCT) test conducted at 121° C. and at 2 atm for 10 hours using the black ink for BJC4000 produced by CANON INC. The resultant sample was washed with water, followed by drying, and was examined for adhesion property by observing the adhesion state of the film of the sample with the Si wafer using a microscope. The evaluated results on the basis of the following reference are shown in Table 1.
(Evaluation Reference)
○: film closely bonded with the substrate in preferable state
Δ: film slightly micro-separated and/or swelled
×: film apparently separated and swelled
(4) Evaluation of Film Formability The film formability of each sample was examined by observing the surface condition (surface smoothness) of the film formed on the Si wafer of the sample using a microscope. The evaluated results on the basis of the following reference are shown in Table 1.
(Evaluation Reference)
○: no waviness, striped unevenness and aggregation on film surface
×: waviness striped unevenness and aggregation observed on film surface Other than the above evaluation items, each sample was examined in terms of solvent-suitability (solvent-solubility) of the resin composition constituting each sample. The evaluated results on the following reference are also shown in Table 1.
(Evaluation Reference)
○: resin composition dissolved in solvents commonly used for ordinary paint, such as acetone and methylisobutyl ketone
×: resin composition not dissolved in the solvents commonly used for ordinary paint Here, a sample having the solvent-suitability evaluated at the mark (○) may be regarded to be high in flexibility when used as a paint because it allows the solvent to be suitably selected in consideration of the material and shape of the coating surface and also allows a leveling agent and an antifoaming agent commonly used for a paint to be added thereto.

The total evaluation for each sample was conducted by totally evaluating the evaluated results in the above evaluation items on the basis of the following reference. The results are also shown in Table 1.
(Evaluation Reference)
⊙: (⊙ or ○) in all evaluation items
○: only (○) in all evaluation items
Δ: not including (X) but including (Δ) in at least one item
×: including (X) in at least one item Hereinafter, the evaluation for the samples will be concretely described with reference to Table 1. Here, Sample Nos. 1 to 8, and 17 pertain to the present invention.

From the results shown in Table 1, it is revealed that each of Sample Nos. 1 to 8, and 17 according to the resin composition of the present invention is excellent in hardness, liquid repellent property, adhesion property, film formability, and solvent-suitability, and therefore, it is suitable as a liquid repellent agent used when a discharging outlet surface of an ink jet head is subjected to a liquid repellent finish.

In particular, each of Sample Nos. 1 to 8 is significantly excellent in hardness as compared with the conventional liquid repellent agent, and therefore, in the case where the resin composition of each of Sample Nos. 1 to 8 is used as a liquid repellent agent for imparting a liquid repellent function onto a discharging outlet surface of an exchangeable type ink jet head cartridge, there can be realized the ink jet head cartridge excellent in the reliability and printing quality.

Table 1 also shows that Sample No. 9 does not have a desired performance in terms of liquid repellent property and adhesion property. The poor liquid repellent property of Sample No. 9 may be considered to be due to the structure of the 2,2-bis [p-(2,3-epoxypropxy) phenyl]-1,1,1,3,3,3-hexafluoropropane "CHEMINOX AFEp" (trade name, produced by Nippon Mektron, Ltd.) in which a perfluoro group having a liquid repellent function is held between benzene rings and thereby it cannot exhibit the characteristic thereof.

Samples Nos. 10 to 12, and 19 and 20, as shown in Table 1, could be evaluated in hardness, liquid repellent property, adhesion property, and film formability because the film forming materials were not hardened. In addition, each of Sample Nos. 12, 19 and 20 was observed to be cloudy because the components used did not come to be in a compatible state.

Table 1 shows that Sample Nos. 13 and 14 are excellent in liquid repellent property but are insufficient in adhesion property and solvent-suitability.

From the results shown in Table 1, it is understood that Sample No. 15 is poor in liquid repellent property. The reason for this is that the content of the component (b) for imparting the liquid repellent function is low.

As is apparent from Table 1, Sample No. 16 is poor in adhesion property and film formability and is insufficient in hardness. The reason for this is that the content of the component (a) is low and thereby the performance inherent to the epoxy resin cannot be sufficiently achieved.

As shown in Table 1, Sample No. 18 is poor in hardness, adhesion property, and film formability and is insufficient in hardness, like Sample No. 16. The reason for this is that the number of monofunctional groups is increased because of the large content of the component (b), and thereby the performance inherent to the epoxy resin cannot be sufficiently achieved.

As can be easily understood from the above results obtained by the experiments, the resin composition (that is, the fluorine-containing epoxy resin composition) of the present invention is able to form on a substrate a high quality liquid repellent film excellent in surface properties (hardness and smoothness) and sufficient in liquid repellent property and adhesion property. In addition, as for the substrate, although the Si wafer is used as the substrate in the above experiments, it was recognized through experiments that the resin composition of the present invention was able to form the above high quality liquid repellent film on a different substrate such as a resin substrate or a metal substrate. The resin composition of the present invention exhibits a significant effect, particularly when used for production of an ink jet head. That is, it enables formation of a liquid repellent resin excellent in surface properties (hardness and smoothness) and sufficient in liquid repellent property and adhesion property on a discharging outlet surface of an ink jet head in a desired shape.

For example, when the fluorine-containing epoxy resin composition in each of Sample Nos. 1 to 8 and 17 according to the present invention is used as a liquid repellent agent in the process described in European Patent Laid-open No. 631869 for imparting a liquid repellent function locally to neighborhoods of discharging outlets of a discharging outlet surface of an ink jet head, the resin composition is effective to be easily decomposed by excimer laser and hence to achieve an excellent patterning accuracy because it contains a benzene ring having a conjugated double bond that easily absorbs the energy of the excimer laser. This makes it possible to form a liquid repellent film excellent in surface properties (hardness and smoothness) and sufficient in liquid repellent property and adhesion property at the neighborhoods of the discharging outlets on the discharging outlet surface of the ink jet head in a desired fine liquid repellent pattern, and hence to achieve a high reliability ink jet head capable of conducting ink discharging at a high accuracy.

On the other hand, when the fluorine-containing epoxy resin composition in each of Sample Nos. 1 to 4, 7, 8 and 17 according to the present invention is used as the liquid repellent agent in the process described in Japanese Patent Laid-open No. 5-124199, the resin composition is able to form a liquid repellent film having excellent surface properties (hardness and smoothness) and sufficient in liquid repellent property and adhesion property at neighborhoods of discharging outlets on a discharging outlet surface of an ink jet head in a desired fine liquid repellent pattern, and hence to achieve a high reliability ink jet head capable of conducting ink discharging at a high accuracy.

Hereinafter, the usability of the fluorine-containing epoxy resin composition according to the present invention will be described with reference to the following examples. In addition, these examples are for illustrative purposes only, and it is to be noted that the present invention is not limited thereto.

EXAMPLES 1 AND 2

In these examples, the fluorine-containing epoxy resin composition of the present invention is used for the production of an ink jet head in accordance with the process which has been described with reference to FIGS. 1 to 12.

EXAMPLE 1

There was provided a silicon substrate having electrothermal converting elements as energy generating elements 2 capable of generating energy for discharging ink and an ink supply port. Separately, there was prepared a coating solution by dissolving a copolymer of methylisopropenyl ketone and methacrylic acid=85/15 copolymer (copolymerization ratio: 85/15, weight-average molecular weight: about 200, 000) in cyclohexanone, to prepare a cyclohexanone solution in a concentration of 18 wt %. The substrate 1 was spin-coated with the resultant cyclohexanone solution at a rotating speed of 700 rpm, followed by drying on a hot plate at 110° C. for 3 minutes, to form a photosensitive resin layer 4. Successively, using a mask aligner PLA-520FA produced by CANON INC. (using cold mirror CM-290), ionizing radiation was irradiated onto the photosensitive resin layer 3 only at a predetermined portion not contributing to the formation of an ink pathway for 2 minutes through a patterning mask, thereby the predetermined portion was solubilized. After that, the exposed portion (solubilized portion) of the photosensitive resin layer 4 was eluted using methylisobutyl ketone, followed by rinsing by xylene, to form an ink pathway-forming pattern 4a. Here, the ink pathway-forming pattern 4a contributes to the formation of an ink pathway which communicates with the ink supply port 3 and contains the energy generating elements 2 therein. Thus, the resist pattern (the ink pathway-forming pattern 4a) is left on the location where the ink pathway is provided. The thickness of the resultant ink pathway-forming pattern 4a after the elution step was found to be 11 μm.

Then, a coating solution was prepared by dissolving, in cyclohexanone, 100 parts by weight of an epoxy resin "EHPE3150" (trade name, produced by Daicel Chemical Industries, Ltd. ); 20 parts by weight of an epoxy resin "Epikote 1002" (trade name, produced by Yuka Shell Epoxy Kabushiki Kaisha); 5 parts by weight of a silane coupling agent "A187" (trade name, produced by Nippon Unicar Co., Ltd.); and 2 parts by weight of a cationic polymerization initiator "SP170" (trade name, produced by Asahi Denka Kogyo K. K.), to form a cyclohexanone solution in a concentration of 50 wt %. The resultant cyclohexanone solution was applied by a spinner onto the ink pathway-forming pattern 4a of the substrate 1 to a film thickness (after drying) of 12 μm, followed by drying on a hot plate at 90° C. for 5 minutes, thereby forming a 12 μm coating resin layer 6 so as to cover the ink pathway-forming pattern 4a. In addition, the resin composition of the coating resin layer 6 has a negative type photosensitive characteristic (a portion irradiated with light is hardened). Then, using a mask aligner MPA600 produced by CANON INC., the coating resin layer 6 was subjected to exposure through a patterning mask shown in FIG. 6 at an exposure amount of $3J/cm^2$. In addition, the principal emission line of the MPA600 is present in a wavelength range more than 366 nm, and thereby the photosensitive resin layer as the ink pathway-forming pattern 4a is not substantially decomposed. The coating resin layer is then heated at 90° C. for 5 minutes, followed by elution of a non-exposed portion of the coating resin layer using methylisobutyl ketone, to form discharging outlets.

Next, there was prepared a coating solution by dissolving, in methylisobutyl ketone, 34 parts by weight of an alicyclic type epoxy resin "EHPE-3158" (trade name, produced by Daicel Chemical Industries, Ltd.) as the component (a); 16 parts by weight of 3-(2-perfluorohexyl) ethoxy-1,2-epoxypropane "MF-120" (trade name, produced by TOHKEM PRODUCT CORPORATION) as the component (b); 25 weight by weight of 2,2-bis [p-(2,3-epoxypropoxy) phenyl]-1,1,1,3,3,3-hexafluoropropane "CHEMINOX AFEP" (trade name, produced by Nippon Mektron, Ltd.) and 25 parts by weight of 1,4-bis (hexaflouro-2-hydoxyl-2-propyl) benzene "1,4-HFAB" (trade name, produced by Central Glass Co., Ltd.) as the component (c); and 1.5 parts by weight of a photo-polymerizing initiator "SP-170" (trade name, produced Asahi Denka Kogyo K. K.) as the component (d), to prepare a methylisobutyl ketone solution in a concentration of 50 wt %. The methylisobutyl ketone solution was further added with 4 parts by weight of the silane coupling agent "A187" (trade name, produced by Nippon Unicar Co., Ltd.) and 0.6 part by weight of a leveling agent "EF-802" (trade name, produced by TOHKEM PRODUCT CORPORATION). The coating resin layer 6 of the substrate 1 was then spin-coated with the resultant solution at a rotational speed of 600 rpm, and was heated at 80° C. for 15 minutes in an oven. Thus, a liquid repellent resin composition layer (hereinafter, referred to simply as a liquid repellent layer) 10 having a thickness of 2.3 μm was formed on the coating resin layer 6 as shown in FIG. 8.

Then, as shown in FIG. 9, the liquid repellent layer 10 was subjected to exposure through a patterning mask 11 having such a pattern as to allow active energy radiation to be transmitted only through neighborhoods of discharging outlets. In this case, the exposure was conducted at an exposure amount of $4J/cm^2$ using the mask aligner MPA600 produced by CANON INC. Thus, the exposed portion of the liquid repellent layer 10 was hardened, so that the patterning for the portion other than the neighborhoods of the discharging outlets was conducted in a desired state. Then, after heating at 90° C. for 45 minutes in the oven, the non-exposed portion of the liquid repellent layer 10 was eluted using methylisobutyl ketone, to locally form a liquid repellent pattern 10a only on the neighborhoods of the discharging outlets as shown in FIG. 10. The local liquid repellent pattern 10a not perfectly hardened was further heated at 100° C. for one hour for the purpose of preventing the pattern from being deformed in a step of eluting the solid layer which will be described later.

Next, in order to decompose the ink pathway-forming pattern 4a, as shown in FIG. 11, ionizing radiation was irradiated onto the ink pathway-forming pattern 4a through the liquid repellent pattern 10a and the coating resin layer 6 for 2 minutes using a mask aligner PLA-520 produced by CANON INC. (cold-mirror CM290)

The substrate 1 was then immersed in methylisobutyl ketone for 15 seconds while effecting ultrasonic wave thereinto, to elute the ink pathway-forming pattern 4a. At this step, since the ink pathway-forming pattern 4a was already decomposed, it could be easily eluted. In addition, although the copolymer used for the coating resin layer 6 is of an ionizing radiation decomposable type, in the case of using CM290, the decomposition reaction is substantially negligible. In this way, an ink pathway 8 was formed, and an ink jet head shown in FIG. 12 was obtained.

EXAMPLE 2

In this example, an ink jet head was prepared in the same manner as that of Example 1, except that 20 parts by weight of the 2,2-bis [p-(2,3-epoxypropoxy) phenyl]-1,1,1,3,3,3-hexafluoropropane "CHEMINOX AFEp" (trade name, produced by Nippon Mektron, Ltd.) and 30 parts by weight of flourohexanediol were used as the component (c) of the resin composition for forming the liquid repellent layer 10.

EVALUATION

Each of the ink jet heads prepared in Examples 1 and 2 was examined in terms of printing performance in the following manner. That is, the ink jet head was mounted on an ink jet system shown in FIG. 13, and was subjected to test printing using the black ink for BJC4000 produced by Canon for 30 pieces of A4 sized sheets. As a result, it was revealed that each of the ink jet heads prepared in Examples 1 and 2 was able to conduct stable printing with a high accuracy.

EXAMPLE 3

In this example, the fluorine-containing epoxy resin composition of the present invention was used as a paint for a hull.

First, there was prepared a resin composition containing 60 parts by weight of a bisphenol A type epoxy resin "Epikote 828" (trade name, produced by Yuka Shell Epoxy Kabushiki Kaisha) as the component (a); 10 parts by weight of the 3-(2-perfluorohexyl) ethoxy-1,2-epoxypropane "MF-120" (trade name, produced by TOHKEM PRODUCTS CORPORATION) as the component (b); and 30 parts by weight of 1,3-bis (glycidoxypropyl) tetramethyldisiloxane "LS7979" (trade name, produced by Shin-Etsu Chemical Co., Ltd.) as the component (c), wherein the components (a), (b) and (c) were uniformly mixed in a compatible state. The resin composition was further added with 60 parts by weight of a siloxane-bonded amine hardening agent "TSL9346" (trade name, produced by Toshiba Silicone Co., Ltd.) and 3 parts by weight of the silane coupling agent "A-187" (trade name, produced by Nippon Unicar Co., Ltd.), and uniformly mixed therewith into a compatible state. The resultant resin composition is further added with 10 parts by weight of titanium oxide as a coloring agent dispersed therein, to prepare a paint.

The paint thus obtained was applied on a portion of a hull to be painted using a brush, followed by being left at room temperature for 24 hours, and was hardened using an infrared ray lamp. The hull thus painted, which was sunk in the sea for 20 days and drawn up, was examined in surface state. As a result, it was observed that the painted portion was kept in a desired state, that is, the sticking of acorn shells, moss, and seaweeds on the painted portion of the hull was significantly reduced.

EXAMPLE 4

In this example, the fluorine-containing epoxy resin composition of the present invention was used for bonding of a lid of an alumite made kettle with a wooden handle.

First, there was prepared a resin composition containing 60 parts by weight of the bisphenol A type epoxy resin "Epikote 828" (trade name, produced by Yuka Shell Epoxy Kabushiki Kaisha) as the component (a); 10 parts by weight of the 3-(2-perfluorohexyl) ethoxy-1,2-epoxypropane "MF-120" (trade name, produced by TOHKEM PRODUCTS CORPORATION) as the component (b); and 30 parts by weight of 1,3-bis (glycidoxypropyl) tetramethyldisiloxane "LS7979" (trade name, produced by Shin-Etsu Chemical Co., Ltd.) as the component (c), wherein the components (a), (b) and (c) were uniformly mixed with each other in a compatible state. The resin composition was further added with 30 parts by weight of a siloxane-bonded amine hardening agent "LS7430" (trade name, produced by Toshiba Silicone Co., Ltd.) and 3 parts by weight of the silane coupling agent "A-187" (trade name, produced by Nippon Unicar Co., Ltd.), to prepare an additive. In this adhesive, the siloxane-bonded amine hardening agent and the silane coupling agent were uniformly mixed with the resin composition into a preferable compatible state.

The adhesive thus obtained was applied using a brush to the handle at a portion to be bonded with the lid of the kettle, and the handle was brought in close-contact with the lid. The handle and the lid in such a state were left at room temperature for 24 hours, followed by thermal curing at 80° C. for 2 hours for hardening the adhesive, to thus complete the bonding of the handle with lid. The kettle covered with the lid bonded with the handle by means of the adhesive was used for boiling water five times, which gave a preferable result that the handle and the lid were not separated from each other.

TABLE 1

| | | Sample No. | | | | | | | | | |
|---|---|---|---|---|---|---|---|---|---|---|---|
| | | 1 | 2 | 3 | 4 | 5 | 6 | 7 | 8 | 9 | 10 |
| Component (a) | EHPE-3158 | | | | 34 | 34 | 34 | 34 | | | |
| | Epikote 828 | 50 | | | | | | | 40 | | |
| | CY179 | | 55 | 70 | | | | | | | |
| Component (b) | MF-120 | 20 | 16 | 10 | 16 | | 16 | 16 | 20 | | 100 |
| | MF-130 | | | | | 16 | | | | | |

TABLE 1-continued

| | | | | | | | | | | | |
|---|---|---|---|---|---|---|---|---|---|---|---|
| Component (c) | CHIMINOX AFEp | | 20 | 25 | | 25 | 20 | 20 | 100 | | |
| | 1,4-HFAB | | 21 | | 25 | 25 | 25 | | | | |
| | LS7970 fluorohexanediol | 30 | | | 25 | | | 30 | 20 | | |
| Component (d) | SP-170 | 1.5 | 1.5 | 1.5 | 1.5 | | | 1.5 | 1.5 | 1.5 | 1.5 |
| | Cu(CF₃SO₃)₂ | | | | | 1 | 1 | | | | |
| DEFENSA7710 | | | | | | | | | | | |
| CTX-805A | | | | | | | | | | | |
| CHEMINOX FAAC | | | | | | | | | | | |
| Sefral Coat A-101B | | | | | | | | | | | |
| Evaluated Item | Hardness Test | ◉ | ◉ | ◉ | ◉ | ◉ | ◉ | ◉ | ◉ | Δ | — |
| | Liquid Repellent Property | ○ | ○ | ○ | ○ | ○ | ○ | ○ | ○ | × | — |
| | Adhesion Property | ○ | ○ | ○ | ○ | ○ | ○ | ○ | ○ | × | — |
| | Film Formability | ○ | ○ | ○ | ○ | ○ | ○ | ○ | ○ | × | — |
| | Solvent-Suitability | ○ | ○ | ○ | ○ | ○ | ○ | ○ | ○ | ○ | ○ |
| | Total Evaluation | ◉ | ◉ | ◉ | ◉ | ◉ | ◉ | ◉ | ◉ | × | × |

| | | Sample No. | | | | | | | | |
|---|---|---|---|---|---|---|---|---|---|---|
| | | 11 | 12 | 13 | 14 | 15 | 16 | 17 | 18 | 19 | 20 |
| Component (a) | EHPE-3158 | | 84 | | | 34 | 5 | 15 | | 34 | |
| | Epikote 828 | | | | | | | | | | 50 |
| | CY179 | | | | | | | | 44 | | |
| Component (b) | MF-120 | 20 | 16 | | | 5 | 16 | 16 | 46 | | |
| | MF-130 | | | | | | | | | | |
| Component (c) | CHIMINOX AFEp | | | | | 31 | 54 | 44 | | 25 | |
| | 1,4-HFAB | | | | | 30 | 25 | 25 | | 25 | |
| | LS7970 fluorohexanediol | 80 | | | | | | | 10 | | 30 |
| Component (d) | SP-170 | 1.5 | 1.5 | | | 1.5 | 1.5 | 1.5 | 1.5 | 1.5 | 1.5 |
| | Cu(CF₃SO₃)₂ | | | | | | | | | | |
| DEFENSA 7710 | | | | 100 | | | | | | | |
| CTX-805A | | | | | 100 | | | | | | |
| CHEMINOX FAAC | | | | | | | | | | 16 | |
| Sefral Coat A-101B | | | | | | | | | | | 20 |
| Evaluated Item | Hardness Test | — | — | Δ | Δ | ◉ | Δ | ○ | Δ | — | — |
| | Liquid Repellent Property | — | — | ◉ | ◉ | × | ○ | ○ | ○ | — | — |
| | Adhesion Property | — | — | Δ | Δ | ○ | × | ○ | × | — | — |
| | Film Formability | — | — | ◉ | ◉ | ○ | × | ○ | × | — | — |
| | Solvent-Suitability | ○ | ○ | ×*1 | ×*1 | ○ | ○ | ○ | ○ | ○ | ×*1 |
| | Total Evaluation | × | × | Δ*2 | Δ*2 | × | × | ○ | × | × | × |

*1: selectively soluble only in specified solvent (freon base solvent)
*2: since solvent-suitability is evaluated at (×) but is soluble in specified solvent (freon based solvent), total evaluation is evaluated at (Δ)

What is claimed is:

1. A fluorine-containing epoxy resin composition for a discharge outlet surface of an ink jet head, said composition comprising:
   a component (a) in an amount of from 5 to 80 parts by weight;
   a component (b) in an amount of from 5 to 40 parts by weight; and
   a component (c) in an amount of from 5 to 80 parts by weight, wherein
      said component (a) comprises a polyfunctional epoxy resin having two or more epoxy groups in one molecule and not containing F and Si;
      said component (b) comprises an epoxy compound having a perfluoro group at a terminal; and
      said component (c) comprises a compound having two or more epoxy groups in one molecule and containing F or Si, and a compound having two or more of one kind or two or more kinds selected from an alcohol group, a carboxylic acid group, and an amine group, and containing F or Si.

2. A fluorine-containing epoxy resin composition according to claim 1, further containing a polymerizing catalyst.

3. A fluorine-containing epoxy resin composition according to claim 2, wherein said polymerizing catalyst is a thermal-polymerizing catalyst.

4. A fluorine-containing epoxy resin composition according to claim 2, wherein said polymerizing catalyst is a photo-polymerizing catalyst.

5. A fluorine-containing epoxy resin composition according to claim 1, further containing a hardening agent.

6. A fluorine-containing epoxy resin composition according to claim 5, wherein said hardening agent is an amino compound containing a siloxane group or perfluoro group or an acid anhydride of said amino compound.

7. A fluorine-containing epoxy resin composition according to claim 1, further containing a silane coupling agent.

8. A fluorine-containing epoxy resin composition according to claim 1, further containing a coloring agent.

9. A fluorine-containing epoxy resin composition according to claim 1, wherein said resin composition is in a solid state at normal temperature.

10. A fluorine-containing epoxy resin composition according to claim 1, wherein said composition is in a liquid state at normal temperature.

11. A fluorine-containing epoxy resin composition according to claim 1, wherein the weight mixing ratio between said compound contained in said component (c) which has two or more epoxy groups in one molecule and contains F or Si, and said compound contained in said component (c) which has two or more of one kind or two or more kinds selected from an alcohol group, a carboxylic acid group, and an amine group and contains F or Si, is in a range of from 1:5 to 5:1.

12. A process for conducting surface treatment for a discharge outlet surface of an ink jet head by forming a liquid repellent film thereon, comprising:
- (1) a step of coating said discharge outlet surface of said ink jet head with a fluorine-containing epoxy resin composition, said fluorine-containing epoxy resin composition comprising:
    a component (a) in an amount of from 5 to 80 parts by weight; a component (b) in an amount of from 5 to 40 parts by weight; and a component (c) in an amount of from 5 to 80 parts by weight, wherein said component (a) comprises a polyfunctional epoxy resin having two or more epoxy groups in one molecule and not containing F and Si; said component (b) comprises an epoxy compound having a perfluoro group at a terminal; and said component (c) comprises a compound having two or more epoxy groups in one molecule and containing F or Si, and a compound having two or more of one kind or two or more kinds selected from an alcohol group, a carboxylic acid group, and an amine group, and containing F or Si; and
- (2) a step of forming a liquid repellent film by hardening said fluorine-containing resin composition coated on said discharge outlet surface of the ink jet head.

13. A process according to claim 12, wherein said fluorine-containing epoxy resin composition further contains a polymerizing catalyst.

14. A process according to claim 13, wherein said polymerizing catalyst is a thermal-polymerizing catalyst.

15. A process according to claim 13, wherein said polymerizing catalyst is a photo-polymerizing catalyst.

16. A process according to claim 12, wherein said fluorine-containing epoxy resin composition further contains a hardening agent.

17. A process according to claim 16, wherein said hardening agent is an amino compound containing a siloxane group or perfluoro group or an acid anhydride of said amino compound.

18. A process according to claim 12, wherein said fluorine-containing epoxy resin composition further contains a silane coupling agent.

19. A process according to claim 12, wherein said fluorine-containing epoxy resin composition further contains a coloring agent.

20. A process according to claim 12, wherein said fluorine-containing epoxy resin composition is in a solid state at normal temperature.

21. A process according to claim 12, wherein said fluorine-containing epoxy resin composition is in a liquid state at normal temperature.

22. A process according to claim 12, wherein the weight mixing ratio between said compound contained in said component (c) which has two or more epoxy groups in one molecule and contains F or Si, and said compound contained in said component (c) which has two or more of one kind or two or more kinds selected from an alcohol group, a carboxylic acid group, and an amine group and contains F or Si, is in a range of from 1:5 to 5:1.

23. A process according to claim 12, wherein said liquid repellent film is selectively formed at a specified region on said discharge outlet surface of the ink jet head.

24. A process according to claim 23, wherein the selective formation of said liquid repellent film is conducted by patterning said resin composition by a photolithography process.

* * * * *

UNITED STATES PATENT AND TRADEMARK OFFICE
CERTIFICATE OF CORRECTION

PATENT NO.    : 6,291,545 B2
DATED         : September 18, 2001
INVENTOR(S)   : Isao Imamura It is certified that error appears in the above-identified patent and that said Letters Patent is hereby corrected as shown below:

<u>Title page,</u>
Item [57], ABSTRACT,
Line 2, "a fluorine-containing epoxy resin composition at least" should be deleted.
Line 3, "containing:" should be deleted.

<u>Column 4,</u>
Line 32, "head" should read -- head. --.

<u>Column 6,</u>
Line 3, "Also" should read -- Also, --.

<u>Column 9,</u>
Line 3, "Also" should read -- Also, --.
Line 4, "solvents are for" should read -- solvent --.
Line 7, "solvent are" should read -- solvents are for --.

<u>Column 14,</u>
Line 10, "flowablity." should read -- flowability. --.
Line 25, "flowablity." should read -- flowability. --.
Line 42, "flowablity." should read -- flowability. --.
Line 61, "flowablity." should read -- flowability. --.

<u>Column 15,</u>
Line 23, "flowablity." should read -- flowability. --.
Line 32, "flowablity." should read -- flowability. --.
Line 44, "flowablity." should read -- flowability. --.
Line 59, "flowablity." should read -- flowability. --.

<u>Column 16,</u>
Line 10, "flowablity." should read -- flowability. --.
Line 26, "flowablity." should read -- flowability. --.
Line 45, "flowablity." should read -- flowability. --.
Line 63, "flowablity." should read -- flowability. --.

UNITED STATES PATENT AND TRADEMARK OFFICE
CERTIFICATE OF CORRECTION

PATENT NO.    : 6,291,545 B2
DATED         : September 18, 2001
INVENTOR(S)   : Isao Imamura It is certified that error appears in the above-identified patent and that said Letters Patent is hereby corrected as shown below:

Column 17,
Line 5, "flowablity." should read -- flowability. --.
Line 15, "flowablity." should read -- flowability. --.
Line 33, "flowablity." should read -- flowability. --.
Line 46, "flowablity." should read -- flowability. --.
Line 59, "flowablity." should read -- flowability. --.

Column 18,
Line 5, "flowablity." should read -- flowability. --.
Line 17, "flowablity." should read -- flowability. --.
Line 29, "flowablity." should read -- flowability. --.

Column 23,
Line 24, "flourohexanediol" should read -- fluorohexanediol --.

Signed and Sealed this

Twenty-seventh Day of May, 2003

JAMES E. ROGAN
*Director of the United States Patent and Trademark Office*